United States Patent
Sawada et al.

(10) Patent No.: US 12,315,227 B2
(45) Date of Patent: May 27, 2025

(54) LABELING DEVICE AND LEARNING DEVICE

(71) Applicant: Mitsubishi Electric Corporation, Tokyo (JP)

(72) Inventors: Tomoya Sawada, Tokyo (JP); Ken Fukuchi, Tokyo (JP); Yoshimi Moriya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 323 days.

(21) Appl. No.: 17/879,535

(22) Filed: Aug. 2, 2022

(65) Prior Publication Data

US 2022/0366676 A1 Nov. 17, 2022

Related U.S. Application Data

(63) Continuation of application No. PCT/JP2020/009092, filed on Mar. 4, 2020.

(51) Int. Cl.
*G06V 10/774* (2022.01)
*G06T 7/11* (2017.01)
*G06V 10/46* (2022.01)

(52) U.S. Cl.
CPC .............. *G06V 10/774* (2022.01); *G06T 7/11* (2017.01); *G06V 10/462* (2022.01); *G06V 10/473* (2022.01)

(58) Field of Classification Search
CPC .... G06V 10/774; G06V 20/70; G06V 10/473; G06V 10/462; G06N 20/00; G06N 3/08; G06T 2207/20081; G06T 7/00; G06T 7/11
See application file for complete search history.

(56) References Cited

U.S. PATENT DOCUMENTS

| | | | |
|---|---|---|---|
| 2016/0098636 A1 | 4/2016 | Okonogi | |
| 2016/0224892 A1 | 8/2016 | Sawada et al. | |
| 2017/0046596 A1* | 2/2017 | Bobbitt | H04N 7/181 |
| 2017/0228645 A1 | 8/2017 | Wang et al. | |
| 2019/0179327 A1* | 6/2019 | Martin | G06V 20/58 |

(Continued)

FOREIGN PATENT DOCUMENTS

| | | |
|---|---|---|
| CN | 110705558 A | 1/2020 |
| JP | 2012-221061 A | 11/2012 |

(Continued)

OTHER PUBLICATIONS

Zhang et al., "A review on automatic image annotation techniques" (Year: 2011).*

(Continued)

*Primary Examiner* — Dung Hong
(74) *Attorney, Agent, or Firm* — Birch, Stewart, Kolasch & Birch, LLP

(57) ABSTRACT

A labeling device includes: an image-signal acquisition unit that acquires an image signal indicating an image captured by a camera; an image recognition unit that has learned by machine learning and performs image recognition on the captured image; and a learning-data-set generation unit that generates, by performing labeling on each object included in the captured image on the basis of a result of image recognition, a learning data set including image data corresponding to each object and label data corresponding to each object.

27 Claims, 18 Drawing Sheets

(56) References Cited

U.S. PATENT DOCUMENTS

| | | | |
|---|---|---|---|
| 2019/0197345 A1 | 6/2019 | Sawada et al. | |
| 2019/0244132 A1 | 8/2019 | Ide | |
| 2019/0354817 A1* | 11/2019 | Shlens | G06T 3/60 |
| 2020/0311575 A1 | 10/2020 | Kong et al. | |
| 2021/0158101 A1* | 5/2021 | Shinzaki | G06F 18/41 |
| 2022/0215253 A1* | 7/2022 | Zeineh | G06N 3/08 |

FOREIGN PATENT DOCUMENTS

| | | |
|---|---|---|
| JP | 2016-76073 A | 5/2016 |
| JP | 2016-143094 A | 8/2016 |
| JP | 2017-107386 A | 6/2017 |
| JP | 2017-167834 A | 9/2017 |
| JP | 2019-509550 A | 4/2019 |
| JP | 2019-74945 A | 5/2019 |
| JP | 2019-75130 A | 5/2019 |
| WO | WO 2016/084336 A1 | 6/2016 |
| WO | WO 2018/051459 A1 | 3/2018 |
| WO | WO 2018/079020 A1 | 5/2018 |
| WO | WO 2021/130881 A1 | 7/2021 |

OTHER PUBLICATIONS

Ke et al., "End-to-End Automatic Image Annotation Based on Deep CNN and Multi-Label Data Augmentation" (Year: 2019).*
European Office Action for European Application No. 20 922 860.0, dated Apr. 23, 2024.
Chen et al., "BlendMask: Top-Down Meets Bottom-Up for Instance Segmentation," Cornell University Library, Arxiv.org, Jan. 2, 2020, pp. 1-12, XP081570580.
Extended European Search Report for corresponding European Application No. 20922860.0, dated Jan. 2, 2023.
Wong et al., "An Assistive Learning Workflow on Annotating Images for Object Detection," 2019 IEEE International Conference on Big Data (Big Data), 2019, pp. 1962-1970.
European Communication pursuant to Article 94(3) EPC for European Application No. 20922860.0, dated Oct. 12, 2023.
He et al., "Mask R-CNN", arXiv:1703.06870v3 [cs.CV], Jan. 24, 2018, pp. 1-12, https://arxiv.org/pdf/1703.06870v3.pdf.
Korean Office Action for Korean Application No. 10-2022-7029033, dated Oct. 18, 2022, with a English translation.

* cited by examiner

FIG. 14

| Scene No. / frame | Recognition Accuracy of Comparative Object Recognition (Mask R-CNN) | | | Recognition Accuracy of Object Recognition According to First Embodiment (Mask R-CNN + GSoC) | | |
|---|---|---|---|---|---|---|
| | visibility raw | visibility > 0.0 | visibility > 0.3 | visibility raw | visibility > 0.0 | visibility > 0.3 |
| 2 / 600 | 1.9 | 2.3 | 3.2 | 35.4 | 35.4 | 63.3 |
| 4 / 1050 | 8.9 | 8.8 | 11.3 | 51.8 | 51.8 | 66.6 |
| 5 / 837 | 2.6 | 2.9 | 3.6 | 61.8 | 61.8 | 79.7 |
| 9 / 525 | 17.3 | 20.2 | 23.3 | 67.1 | 80.4 | 88.4 |
| 10 / 654 | 21.3 | 21.1 | 25.0 | 48.4 | 48.4 | 57.4 |
| 11 / 900 | 13.4 | 13.9 | 17.5 | 64.0 | 64.0 | 76.4 |
| 13 / 750 | 4.4 | 4.4 | 4.6 | 36.5 | 36.5 | 41.6 |

LABELING DEVICE AND LEARNING DEVICE

CROSS REFERENCE TO RELATED APPLICATION

This application is a Continuation of PCT International Application No. PCT/JP2020/009092, filed on Mar. 4, 2020, all of which is hereby expressly incorporated by reference into the present application.

TECHNICAL FIELD

The present disclosure relates to a labeling device and a learning device.

BACKGROUND ART

Conventionally, various techniques related to supervised learning have been developed. Learning data in supervised learning is labeled in advance. Patent Literature 1 discloses a technique of predicting learning performance on the basis of the labeling state of learning data.

CITATION LIST

Patent Literatures

Patent Literature 1: WO 2018/079020

SUMMARY OF INVENTION

Technical Problem

In general, labeling of learning data is performed manually. Hereinafter, the person who labels the learning data may be referred to as "labeling person". In addition, the work of labeling the learning data may be referred to as "labeling work".

Conventionally, various techniques related to object detection have been developed in object recognition in computer vision. In addition, various techniques related to scene segmentation have also been developed. In object detection, a tool such as "labelling" is used for the labeling work. In scene segmentation, a tool such as "Labelbox" is used for the labeling work.

Even if these tools are used, the workload of the labeling work is applied on the labeling person. In particular, when labeling work for a large amount of learning data is required, there is a problem that the workload on the labeling person is large.

The present disclosure has been made to solve the above problem, and an object of the present disclosure is to reduce the workload of labeling work on a labeling person.

Solution to Problem

A labeling device according to the present disclosure includes: image-signal acquisition circuitry to acquire an image signal indicating an image captured by a camera; image recognition circuitry which has learned by machine learning, to perform image recognition on the captured image; and learning-data-set generation circuitry to generate, by performing labeling on one or more individual objects included in the captured image on a basis of a result of the image recognition, a learning data set including image data corresponding to each of the objects and label data corresponding to each of the objects.

Advantageous Effects of Invention

According to the present disclosure, with the configuration described above, the labeling work can be automated or semi-automated. As a result, the workload on the labeling person can be reduced.

BRIEF DESCRIPTION OF DRAWINGS

FIG. 14 is an explanatory diagram illustrating an example of recognition accuracy of comparative object recognition and an example of recognition accuracy of object recognition according to the first embodiment.

DESCRIPTION OF EMBODIMENTS

Hereinafter, in order to describe the present disclosure in more detail, modes for carrying out the present disclosure will be described with reference to the accompanying drawings.

First Embodiment

Figure 1:
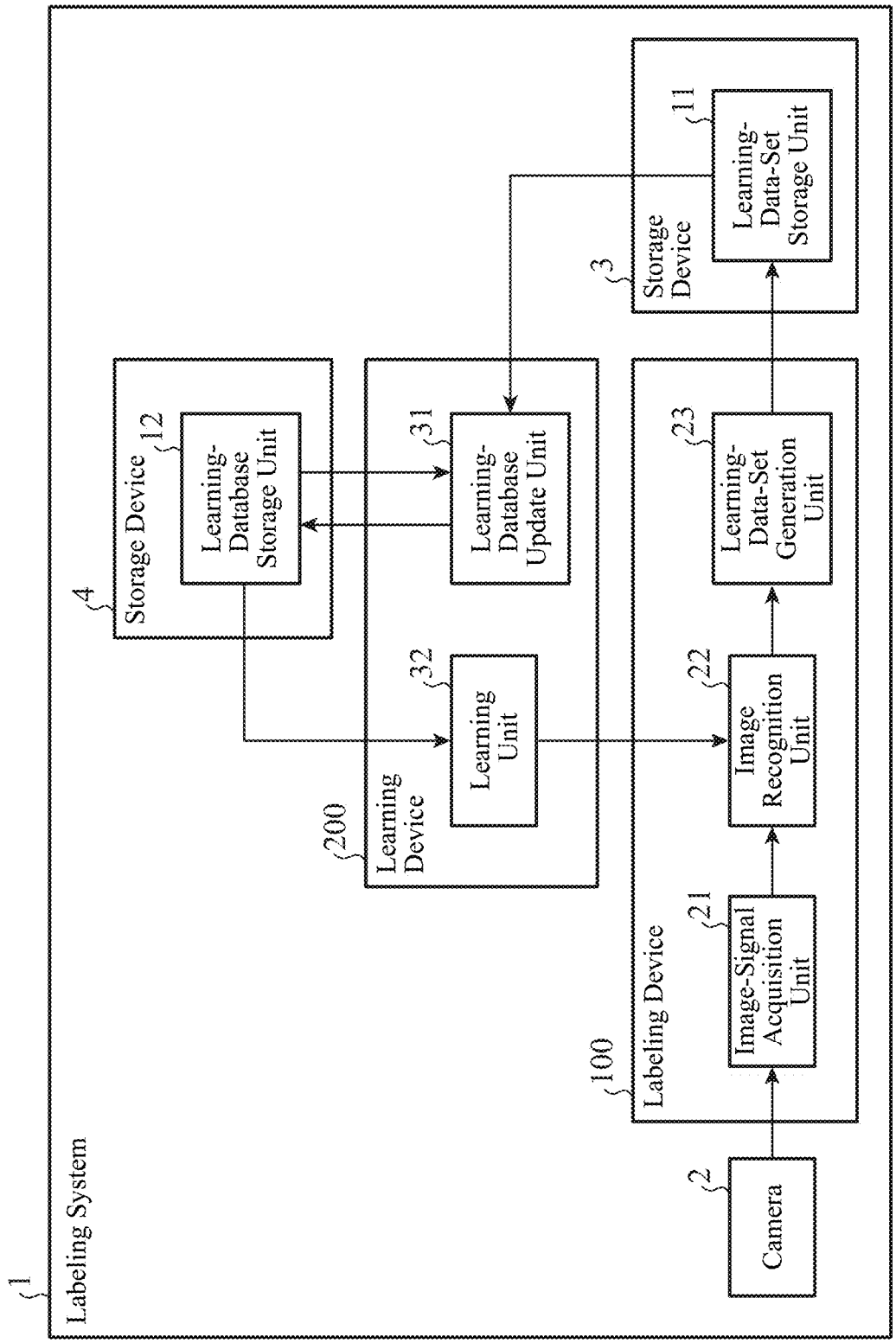
FIG. 1 is a block diagram illustrating a main part of a labeling system according to a first embodiment.
Figure 2:
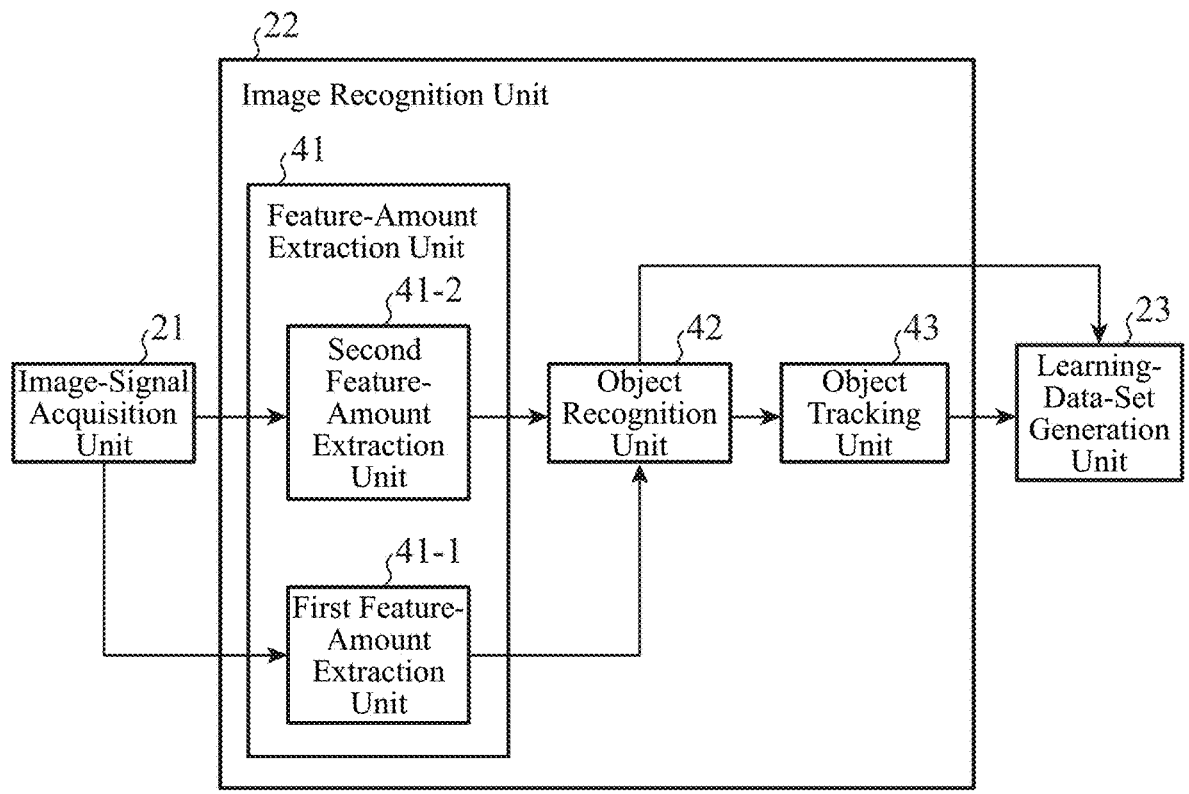
FIG. 2 is a block diagram illustrating a main part of an image recognition unit in a labeling device according to the first embodiment.
Figure 3:
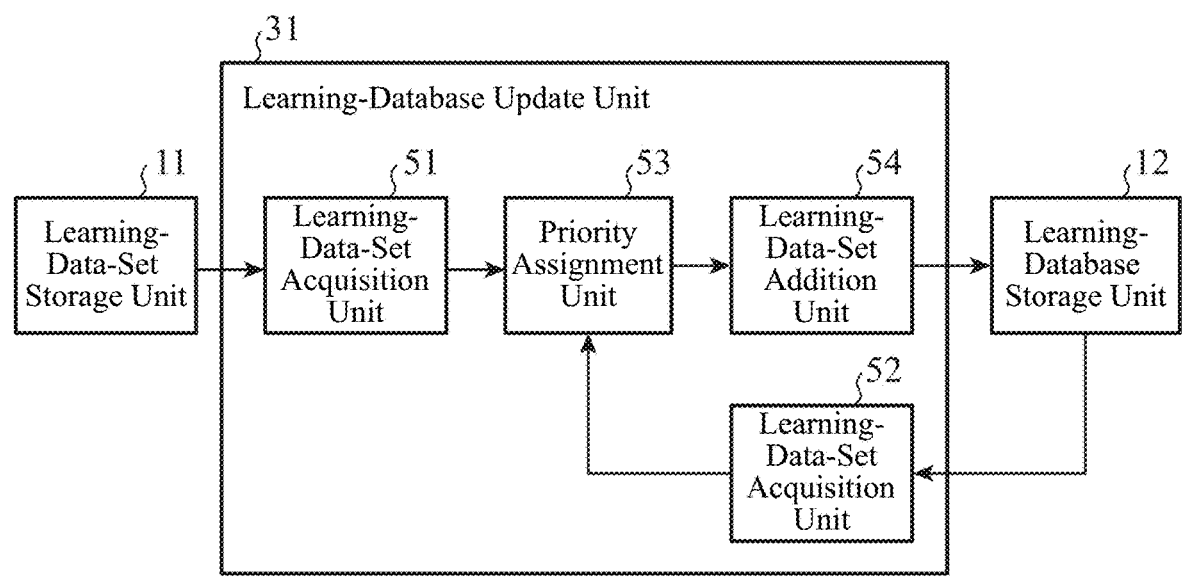
FIG. 3 is a block diagram illustrating a main part of a learning-database update unit in a learning device according to the first embodiment.

FIG. 1 is a block diagram illustrating a main part of a labeling system according to a first embodiment. FIG. 2 is a block diagram illustrating a main part of an image recognition unit in a labeling device according to the first embodiment. FIG. 3 is a block diagram illustrating a main part of a learning-database update unit in the learning device according to the first embodiment. The labeling system according to the first embodiment will be described with reference to FIGS. 1 to 3.

As illustrated in FIG. 1, a labeling system 1 includes a camera 2, a storage device 3, a storage device 4, a labeling device 100, and a learning device 200. The storage device 3 includes a learning-data-set storage unit 11. The storage device 4 includes a learning-database storage unit 12. The labeling device 100 includes an image-signal acquisition unit 21, an image recognition unit 22, and a learning-data-set generation unit 23. The learning device 200 includes a learning-database update unit 31 and a learning unit 32.

The camera 2 is a monitoring camera. Specifically, for example, the camera 2 is a surveillance camera, a security camera, or an electronic mirror camera. The camera 2 includes a visible light camera or an infrared camera, and also includes a camera for capturing a video. Hereinafter, the individual still images constituting a video captured by the camera 2 may be referred to as "captured images".

The image-signal acquisition unit 21 acquires an image signal indicating a captured image. The image recognition unit 22 performs image recognition using the acquired image signal. Here, image recognition performed by the image recognition unit 22 includes object recognition and tracking. Furthermore, object recognition performed by the image recognition unit 22 includes at least one of object detection and scene segmentation.

That is, as illustrated in FIG. 2, the image recognition unit 22 includes a feature-amount extraction unit 41, an object recognition unit 42, and an object tracking unit 43. The feature-amount extraction unit 41 includes a first feature-amount extraction unit 41_1 and a second feature-amount extraction unit 41_2.

The first feature-amount extraction unit 41_1 generates a feature map (hereinafter, may be referred to as "first feature map") corresponding to each captured image using the acquired image signal. The first feature map includes a plurality of feature amounts (hereinafter, may be referred to as "first feature amounts") arranged in two directions orthogonal to each other.

Figure 4:
FIG. 4 is an explanatory diagram illustrating an example of a captured image.
Figure 5:
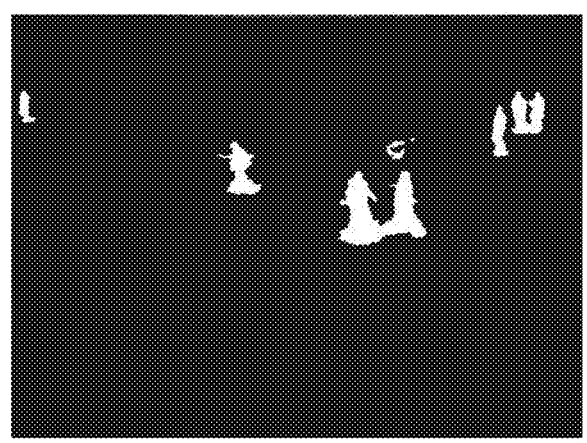
FIG. 5 is an explanatory diagram illustrating an example of a first feature map corresponding to the captured image illustrated in FIG. 4.

Here, the first feature map corresponds to a foreground mask for each attribute. In this case, the first feature-amount extraction unit 41_1 generates the first feature map by generating a foreground mask for each attribute using, for example, background subtraction developed in Google Summer of Code (GSoC) 2017. FIG. 4 illustrates an example of a captured image. FIG. 5 illustrates an example of a first feature map corresponding to such a captured image and based on background subtraction. More specifically, FIG. 5 illustrates an example of a foreground mask corresponding to an attribute "person".

Alternatively, the first feature map corresponds to a mid-level feature corresponding to objectness. That is, each first feature amount in the first feature map uses such a mid-level feature. Note that "mid-level" is equivalent to a level based on a human visual model. That is, "mid-level" is lower than a feature level used in conventional object recognition.

Figure 6:
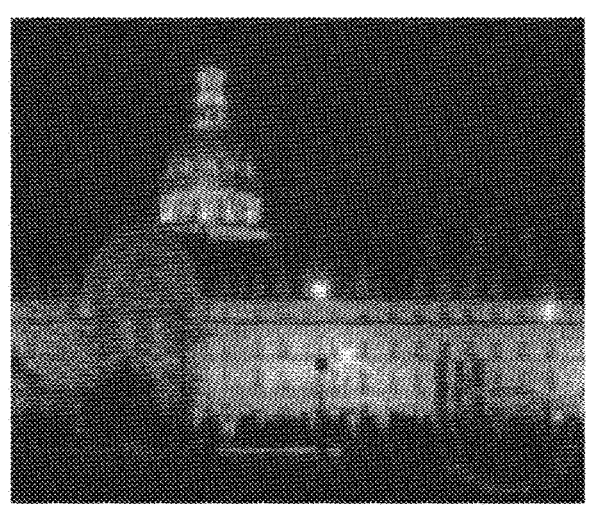
FIG. 6 is an explanatory diagram illustrating an example of another captured image.
Figure 7:
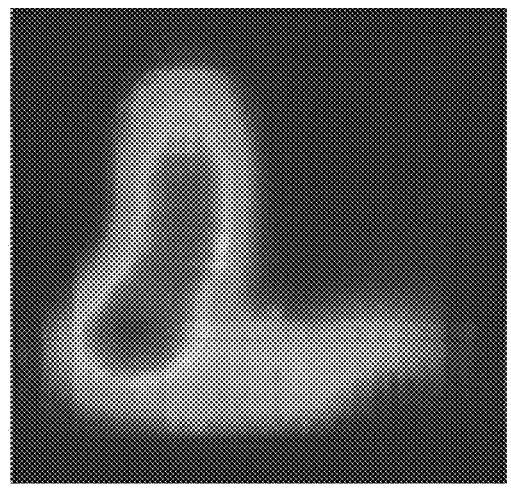
FIG. 7 is an explanatory diagram illustrating an example of a first feature map corresponding to the captured image illustrated in FIG. 6.

The mid-level feature uses, for example, attention. In this case, the first feature-amount extraction unit 41_1 generates the first feature map by generating an attention map using an attention mechanism, for example. FIG. 6 illustrates an example of a captured image. FIG. 7 illustrates an example of a first feature map corresponding to such a captured image and based on attention.

Alternatively, the mid-level feature uses saliency, for example. In this case, the first feature-amount extraction unit 41_1 generates the first feature map by generating a saliency map using a method similar to the method described in Reference Literature 1 below. That is, the first feature-amount extraction unit 41_1 generates the first feature map by performing saliency estimation.

Reference Literature 1

WO 2018/051459

Note that the mid-level feature is only required to correspond to objectness, and is not limited to attention or saliency. In addition, the method of generating the first feature map by the first feature-amount extraction unit 41_1 is not limited to the specific examples described above. For example, the first feature-amount extraction unit 41_1 can generate the first feature map using at least one of image gradient detection, saliency estimation, background subtraction, objectness estimation, attention, and scene segmentation.

Hereinafter, an example of a case where the first feature-amount extraction unit 41_1 generates a foreground mask for each attribute by background subtraction will be mainly described.

The second feature-amount extraction unit 41_2 generates one or more feature maps (hereinafter, may be referred to as "second feature maps") corresponding to each captured image using the acquired image signal. The second feature map is sequentially generated using, for example, a convolutional neural network (hereinafter, may be denoted as "CNN"). Each of the second feature maps includes a plurality of feature amounts (hereinafter, may be referred to as "second feature amounts") arranged in two directions orthogonal to each other.

Figure 8:
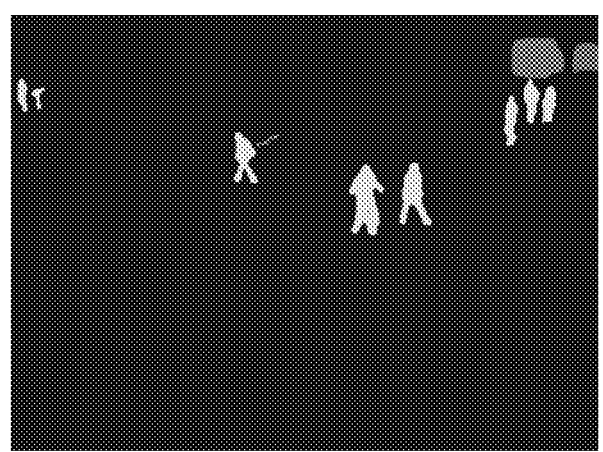
FIG. 8 is an explanatory diagram illustrating an example of a second feature map corresponding to the captured image illustrated in FIG. 4.

Here, the second feature map corresponds to a high-level feature. That is, each second feature amount uses such a high-level feature. Note that "high-level" is equivalent to a feature level used in conventional object recognition. That is, "high-level" is higher than a level based on a human visual model. FIG. 8 illustrates an example of a second feature map corresponding to the captured image illustrated in FIG. 4.

The object recognition unit 42 performs object recognition using the generated first feature map and the generated second feature map. Object recognition performed by the object recognition unit 42 includes at least one of object detection and scene segmentation, as described above.

In object detection, the position of each object included in a captured image is estimated by regression, and an attribute of the corresponding object is estimated by classify. By performing object detection, information indicating a bounding box corresponding to coordinates (x, y, w, h) for position and size, information indicating a label corresponding to an attribute, information indicating the confidence of each bounding box, and the like are output, for each object included in the captured image.

Scene segmentation divides the captured image into regions corresponding to respective attributes. Scene segmentation allows the captured image to be divided into a plurality of regions on a pixel-by-pixel basis. With scene segmentation, information indicating the area of each region, information indicating the attribute of each region, and the like are output.

Specifically, for example, the object recognition unit 42 performs both object detection and scene segmentation by Mask Region-based CNN (R-CNN). Hereinafter, an example of a case where Mask R-CNN is used in the object recognition unit 42 will be mainly described. Mask R-CNN is described in Reference Literature 2 below.

Reference Literature 2

Figure 9:
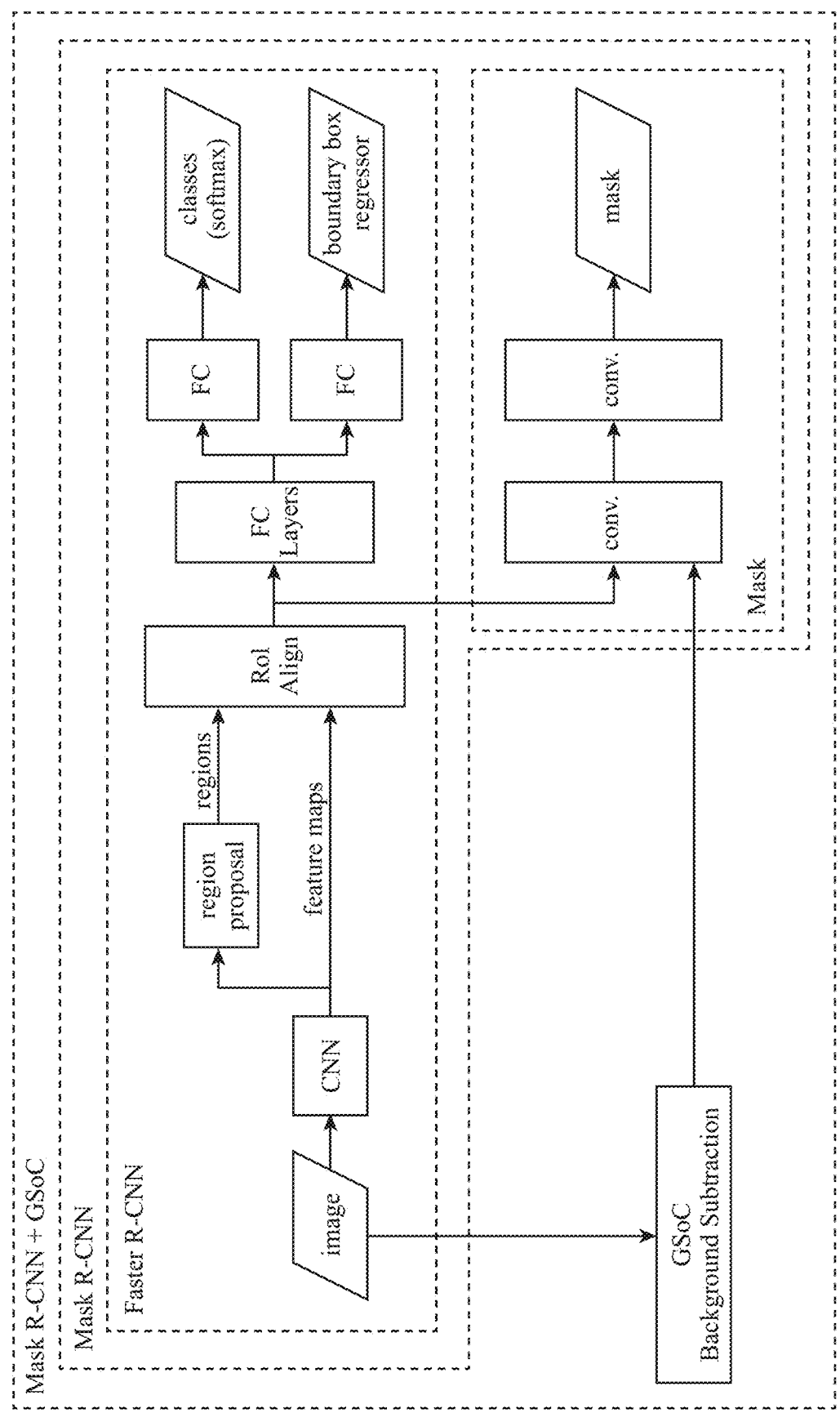
FIG. 9 is an explanatory diagram illustrating a neural network structure in "Mask R-CNN+GSoC".

Kaiming He, Georgia Gkioxari, Ross Girshick, et al. "Mask R-CNN," v3, 24 Jan. 2018, https://arxiv.org/pdf/1703.06870v3.pdf FIG. 9 illustrates an example of a neural network structure corresponding to the feature-amount extraction unit 41 and the object recognition unit 42 in a case where the first feature-amount extraction unit 41_1 generates a foreground mask for each attribute by background subtraction and the object recognition unit 42 performs both object detection and scene segmentation by Mask R-CNN. Hereinafter, such a neural network may be referred to as "Mask R-CNN+GSoC".

In FIG. 9, "GSoC Background Subtraction" corresponds to the first feature-amount extraction unit 41_1. In addition, CNN of "Faster R-CNN" in "Mask R-CNN" corresponds to the second feature-amount extraction unit 41_2. Furthermore, the block group subsequent to CNN in "Mask R-CNN" corresponds to the object recognition unit 42.

CNN of "Faster R-CNN" in "Mask R-CNN" uses, for example, a network obtained by combining feature pyramid networks (FPN) with Residual Network (ResNet)-101. Furthermore, as illustrated in FIG. 9, "Mask" in "Mask R-CNN" includes a plurality of convolution blocks ("cony." in FIG. 9).

The neural network illustrated in FIG. 9 is learned in advance using an existing large-scale database. Specifically, for example, the neural network illustrated in FIG. 9 is learned in advance using Microsoft Common Objects in Context (COCO). In other words, the image recognition unit 22 is learned in advance using such a large-scale database.

Note that the database used for learning of the image recognition unit 22 is not limited to Microsoft COCO. The image recognition unit 22 can be, for example, learned in advance using a public database from "OpenAI". Hereinafter, an example of a case where the image recognition unit 22 is learned in advance using Microsoft COCO will be mainly described.

By preliminary learning using such a large-scale database, an object with a learned shape among objects included in the captured image can be recognized with high accuracy. Furthermore, object recognition with a certain degree of accuracy can be performed on an object with an unlearned shape among the objects included in the captured image.

Here, in object recognition performed by the object recognition unit 42, a feature map (hereinafter, may be referred to as "third feature map") obtained by combining the first feature map and the second feature map is used as follows. Furthermore, in object recognition performed by the object recognition unit 42, the threshold is set to a value lower than that of conventional object recognition (that is, object recognition using the second feature map instead of the third feature map). Hereinafter, a specific example of the third feature map will be described.

<First Specific Example of Third Feature Map>

When the first feature map uses a foreground mask, the object recognition unit 42 weights, using the individual first feature amounts in the first feature map, the corresponding second feature amounts in the individual second feature maps. At this time, the object recognition unit 42 sets a value (hereinafter referred to as "importance") W indicating a weight of such weighting as follows.

That is, the object recognition unit 42 calculates similarity S between each of the individual first feature amounts in the first feature map and a corresponding one of the second feature amounts in the individual second feature maps. The similarity S is, for example, a value based on at least one of Earth Mover's Distance (EMD), Cosine Similarity, Kullback-Leibler Divergence (KLD), L2 norm, L1 norm, and Manhattan Distance.

Next, the object recognition unit 42 sets the importance W corresponding to each of the second feature amounts using the calculated similarity S. At this time, for each of the second feature amounts, the object recognition unit 42 sets the importance W to a larger value as the corresponding similarity S becomes larger (that is, as the corresponding distance becomes shorter). In other words, for each of the second feature amounts, the object recognition unit 42 sets the importance W to a smaller value as the corresponding similarity S becomes smaller (that is, as the corresponding distance becomes longer).

By performing such weighting, the second feature amount related to a region corresponding to a foreground object in the captured image is made to be relatively stronger than the second feature amount related to a region corresponding to a background in the captured image. In other words, the second feature amount related to the region corresponding to the background in the captured image is made to be relatively weaker than the second feature amount related to the region corresponding to the foreground object in the captured image. In this manner, a plurality of third feature maps corresponding to the first feature maps are generated.

Figure 10:
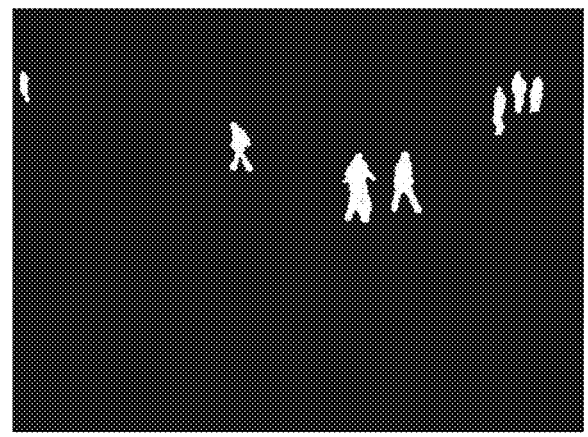
FIG. 10 is an explanatory diagram illustrating an example of a third feature map corresponding to the captured image illustrated in FIG. 4.

FIG. 10 illustrates an example of the third feature map generated in this manner. The third feature map illustrated in FIG. 10 corresponds to the captured image illustrated in FIG. 4. That is, the third feature map illustrated in FIG. 10 is generated by weighting the second feature map illustrated in FIG. 8 using the first feature map illustrated in FIG. 5.

Figure 11:
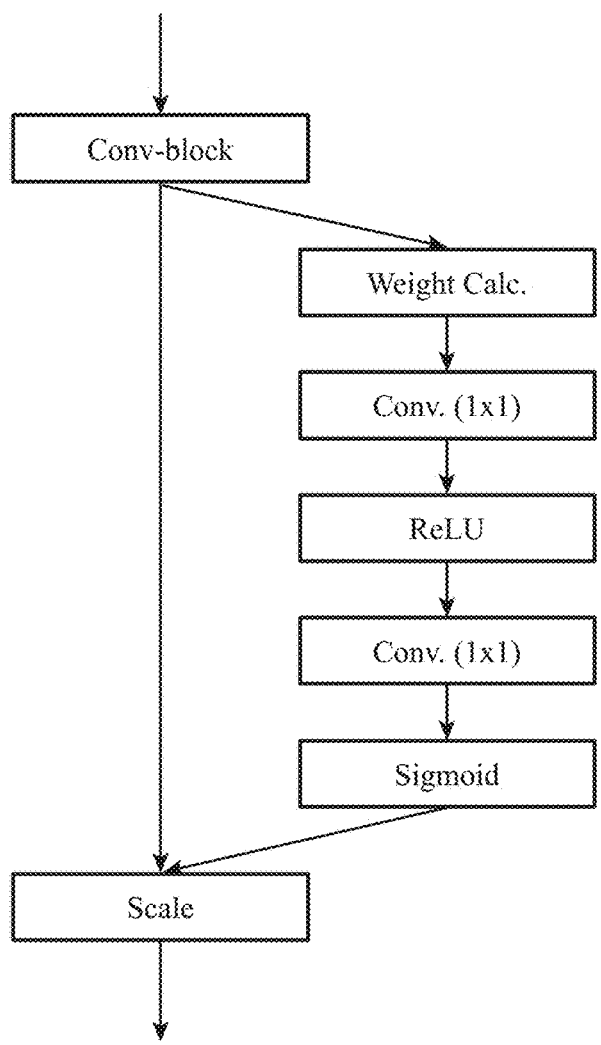
FIG. 11 is an explanatory diagram illustrating a neural network structure of a first convolution block in "Mask R-CNN+GSoC".

Such weighting is performed, for example, in the first convolution block of "Mask" in "Mask R-CNN+GSoC". FIG. 11 illustrates an example of a neural network structure of the first convolution block in this case. As illustrated in FIG. 11, the neural network includes a weight calculation layer (in FIG. 11, "Weight Calc."). The importance W as described above is set by the weight calculation layer.

<Second Specific Example of Third Feature Map>

When the first feature map uses a foreground mask, the object recognition unit 42 calculates an inner product, by performing element-wise multiplication between each of the individual first feature amounts in the first feature map and the corresponding second feature amount in the individual second feature maps.

By performing such a calculation, the second feature amount related to a region corresponding to a foreground object in the captured image is made to be relatively stronger than the second feature amount related to a region corresponding to a background in the captured image. In other words, the second feature amount related to the region corresponding to the background in the captured image is made to be relatively weaker than the second feature amount related to the region corresponding to the foreground object in the captured image. In this manner, a plurality of third feature maps corresponding to the first feature maps are generated.

Such a calculation is performed, for example, in the first convolution block of "Mask" in "Mask R-CNN+GSoC".

<Third Specific Example of Third Feature Map>

When the first feature map uses attention, the object recognition unit 42 weights, using the individual first feature amounts in the first feature map, the corresponding second feature amounts in the individual second feature maps. At this time, the object recognition unit 42 sets the importance W as follows.

That is, the object recognition unit 42 selects a representative value in each of second feature maps by using global average pooling (GAP). The object recognition unit 42 sets the importance W on the basis of the selected representative value. That is, the object recognition unit 42 sets the importance W to a value based on the selected representative value.

With such weighting, a plurality of third feature maps corresponding to the second feature maps are generated. Alternatively, one third feature map corresponding to one second feature map is generated.

Such weighting is performed, for example, in the first convolution block of "Mask" in "Mask R-CNN+GSoC". The neural network in the first convolutional block in this case has a GAP layer instead of the weight calculation layer in the structure illustrated in FIG. 11. As a result, the importance W as described above is set.

By using the third feature map generated in accordance with the first specific example, the second specific example, or the third specific example for object recognition, it is possible to avoid the occurrence of misrecognition in which a part of the background is recognized as an object as compared with a case where the second feature map is used for object recognition. Further, since the occurrence of misrecognition can be suppressed while using a low threshold as described above, the object can be recognized with high accuracy. In particular, it is possible to improve the recognition accuracy for an object with an unlearned shape.

Note that the first convolution block of "Mask" in "Mask R-CNN+GSoC" usually includes a step of performing convolution (hereinafter, may be referred to as "first step"), a step of performing deconvolution (may be hereinafter, referred to as "second step"), and a step of performing point-wise convolution (hereinafter, may be referred to as "third step"). Weighting according to the first specific example can be performed in the first step or can be performed in the third step. Weighting according to the second specific example can be performed in the first step or can be performed in the third step. Weighting according to the third specific example can be performed in the first step or can be performed in the third step.

That is, weighting according to the first specific example, the calculation according to the second specific example, or weighting according to the third specific example can be preferably performed in the first step or can be preferably performed in the third step depending on the number of neural network layers or the like. It is only required that a more preferable step is selected among these steps.

Hereinafter, object recognition that performs object detection and object recognition using the third feature map may be referred to as "object recognition according to the first embodiment". That is, object recognition according to the first embodiment uses "Mask R-CNN+GSoC". On the other hand, object recognition that performs object detection and scene segmentation using the second feature map may be referred to as "comparative object recognition". That is, comparative object recognition uses "Mask R-CNN".

Figure 12:
FIG. 12 is an explanatory diagram illustrating an example of a recognition result by comparative object recognition.
Figure 13:
FIG. 13 is an explanatory diagram illustrating an example of a recognition result by object recognition according to the first embodiment.

FIG. 12 illustrates an example of a recognition result by comparative object recognition. On the other hand, FIG. 13 illustrates an example of a recognition result by object recognition according to the first embodiment. More specifically, FIG. 13 illustrates an example of a recognition result related to an attribute "person". These recognition results correspond to the captured image illustrated in FIG. 4.

Here, effects obtained by using "Mask R-CNN+GSoC" will be described with reference to FIG. 14. That is, the effects of improving the accuracy of object recognition compared to the case of using "Mask R-CNN" will be described.

The left half part of the table illustrated in FIG. 14 shows experimental results related to the recognition accuracy of comparative object recognition. On the other hand, the right half part of the table illustrated in FIG. 14 shows experimental results related to the recognition accuracy of object recognition according to the first embodiment. These experiments use evaluation data of 5317 frames in the MOT16 benchmark.

Numerical values in the respective columns of the table indicate mean average precision (mAP), and its unit is %. Furthermore, "visibility>0.X" in the table indicates that only an object in which a part occupying more than 10×X % of the entire object is shown in the image is set as a recognition target. In other words, it is indicated that an object in which a part occupying only 10×X % or less of the entire object is shown in the image is excluded from the recognition target.

As illustrated in FIG. 14, by using "Mask R-CNN+GSoC", the value of mAP greatly increases as compared with the case of using "Mask R-CNN". That is, the accuracy of object recognition is greatly improved.

The object tracking unit 43 tracks each object included in the captured image, by using the result of object recognition performed by the object recognition unit 42 in time series. As a result, it is possible to suppress, for each object, a decrease in recognition accuracy of each object due to a change in apparent shape in a video captured by the camera 2.

That is, for example, when a certain object moves, the apparent shape of the object may change with time in the video captured by the camera 2. At this time, the apparent shape of the object may be a learned shape in the captured image at a certain timing, whereas the shape of the object may be an unlearned shape in the captured image at another timing. Then, since the object is not recognized by object recognition at the latter timing, object recognition may be temporally unstable.

On the other hand, by tracking the object, the object can be recognized even at the latter timing. The recognition of the object can thus be temporally stabilized. As a result, the recognition accuracy of the object can be further improved.

Tracking performed by the object tracking unit 43 is, for example, as follows. That is, on the basis of the result of object detection in a captured image corresponding to an Nth frame (N is any integer), the object tracking unit 43 performs regression with a tracking-loss based on a distance such as KLD, in terms of the attribute of each object, the coordinates of each object, and the population proportion of the foreground to the background in each small region. As a result, the object tracking unit 43 predicts the position and size of each object in a captured image corresponding to an N+1th frame.

Next, by comparing the result of the prediction with the result of object detection in the captured image corresponding to the N+1th frame, the object tracking unit 43 detects an object that is detected by object detection in the captured image corresponding to the Nth frame but is not detected by object detection in the captured image corresponding to the N+1th frame. As a result, it is possible to continuously detect an object that is included in the captured image corresponding to the N+1th frame but is not detected by object detection.

In addition, various known techniques can be used in tracking performed by the object tracking unit 43. Detailed description of these techniques will be omitted.

The learning-data-set generation unit 23 generates a learning data set corresponding to each object included in the captured image, on the basis of the result of object recognition performed by the object recognition unit 42 and the result of tracking performed by the object tracking unit 43.

Here, the learning data set includes data indicating an image in a bounding box corresponding to each object (hereinafter, referred to as "image data"), data indicating a label corresponding to an attribute of each object (hereinafter, referred to as "label data"), data indicating a mask corresponding to a region corresponding to each object (hereinafter, referred to as "mask data"), and the like. It can be said that generating such a learning data set is labeling each object included in the captured image.

In addition, the learning data set includes data used for assignment of a priority P (hereinafter, referred to as "data for priority assignment") by a priority assignment unit 53 to be described later. The data for priority assignment includes, for example, data indicating the confidence of object recognition related to each object (hereinafter, referred to as "confidence data").

Note that the data for priority assignment is not limited to the confidence data. The data for priority assignment can include, for example, instead of or in addition to the confidence data, at least one of data indicating a size of each object, data indicating a high-dimensional image feature of each object, data indicating a low-dimensional image feature of each object, data indicating objectness of each object, data indicating a result of saliency estimation of each object, and data indicating attention of each object.

Hereinafter, an example of a case where the learning data set includes image data, label data, mask data, and confidence data will be mainly described.

Here, as described above, the object recognition unit 42 uses the third feature map for object recognition. This makes it possible to avoid the occurrence of misrecognition in which a part of the background is recognized as an object. As a result, it is possible to avoid generation of a learning data set corresponding to Easy Example in Focal Loss in the learning-data-set generation unit 23. That is, it is possible to avoid generation of a learning data set including image data corresponding to the background. Consequently, in relearning or additional learning of the image recognition unit 22 by the learning unit 32 to be described later, convergence of such learning can be accelerated.

The learning-data-set storage unit 11 stores the learning data set generated by the learning-data-set generation unit 23. The learning-database update unit 31 updates a learning database stored in the learning-database storage unit 12, using the learning data set stored in the learning-data-set storage unit 11.

That is, as illustrated in FIG. 3, the learning-database update unit 31 includes a learning-data-set acquisition unit 51, a learning-data-set acquisition unit 52, the priority assignment unit 53, and a learning-data-set addition unit 54.

The learning-data-set acquisition unit 51 acquires a learning data set (hereinafter, may be referred to as "first learning data set") stored in the learning-data-set storage unit 11. The learning-data-set acquisition unit 52 acquires a plurality of learning data sets (hereinafter, may be referred to as "second learning data sets") included in the learning database stored in the learning-database storage unit 12.

The priority assignment unit 53 assigns the priority P in relearning or additional learning by the learning unit 32 to be described later to the acquired first learning data set. At this time, the priority assignment unit 53 assigns the priority P in such a way that the learning priority of a data set with a high learning value increases (that is, the learning priority of a data set with a low learning value decreases), on the basis of the variation in a distribution D of the acquired second learning data sets.

Figure 15:
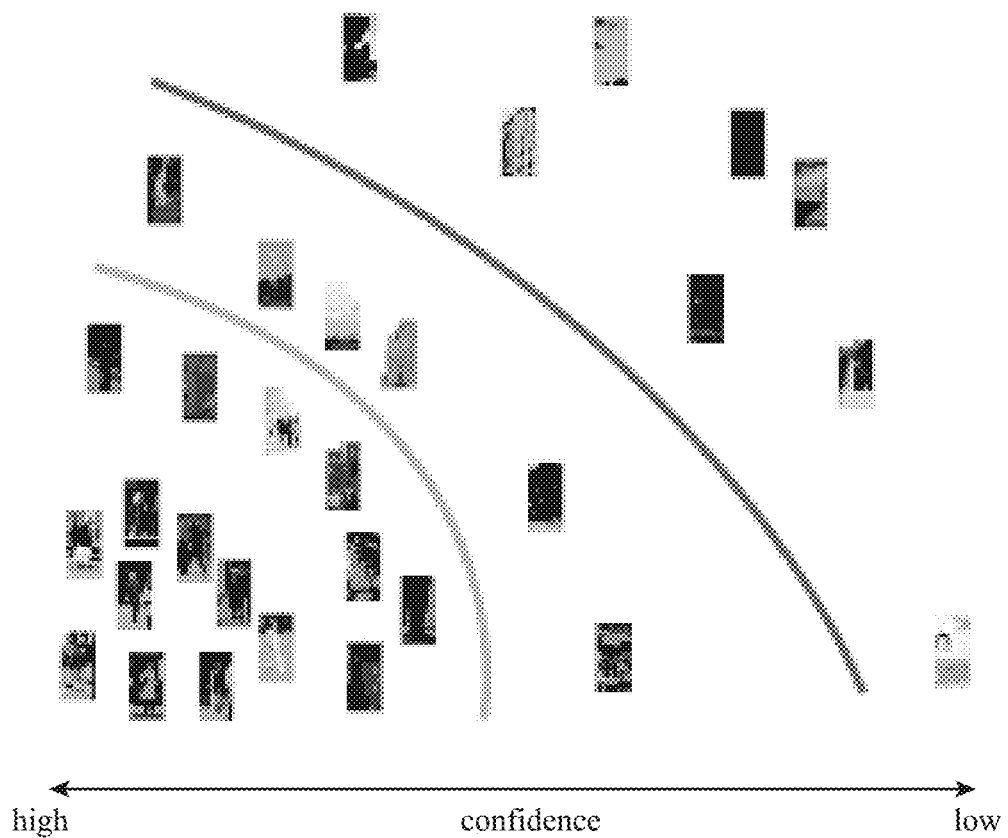
FIG. 15 is an explanatory diagram illustrating an example of a confidence map.

Here, the distribution D is a distribution based on the data for priority assignment. Specifically, for example, the distribution D is a distribution in a confidence map based on the confidence data. FIG. 15 illustrates an example of the confidence map. In this case, the priority assignment unit 53 sets the priority P as follows, for example.

That is, on the basis of the variation in the confidence map, the priority assignment unit 53 classifies the acquired second learning data sets into a data set group in which a data set with high confidence is sufficiently accumulated (hereinafter, referred to as "first data set group"), a data set group in which a data set with high confidence is accumulated to some extent (hereinafter, referred to as "second data set group"), and a data set group in which a data set with high confidence is insufficient (hereinafter, referred to as "third data set group"). Such classification is based on, for example, the label indicated by the label data (that is, the attribute of the corresponding object) or the shape of the mask indicated by the mask data (that is, the apparent shape of the corresponding object).

Next, the priority assignment unit 53 determines which of the first data set group, the second data set group, and the third data set group the acquired first learning data set is to be classified into. Such determination is based on, for example, the label indicated by the label data (that is, the attribute of the corresponding object) or the shape of the mask indicated by the mask data (that is, the apparent shape of the corresponding object).

In a case where the acquired first learning data set is to be classified into the first data set group, it is conceivable that the first learning data set has a low learning value. Consequently, the priority assignment unit 53 sets the priority P of the first learning data to a low value. In addition, in a case where the acquired first learning data set is to be classified into the second data set group, it is conceivable that the first learning data set has a medium learning value. Consequently, the priority assignment unit 53 sets the priority P of the first learning data to a medium value. Furthermore, in a case where the acquired first learning data set is to be classified into the third data set group, it is conceivable that the first learning data set has a high learning value. Consequently, the priority assignment unit 53 sets the priority P of the first learning data to a high value.

Note that the distribution D is only required to be a distribution based on the data for priority assignment, and is not limited to the distribution based on the confidence data. For example, the distribution D can be a distribution based on at least one of confidence, a size, a high-dimensional image feature, a low-dimensional image feature, objectness, saliency estimation, and attention.

In addition, the method for the priority assignment unit 53 to assign the priority P is not limited to the above specific example. It is only required that the priority assignment unit 53 assigns the priority P in such a way that the learning priority of a data set with a high learning value increases (that is, the learning priority of a data set with a low learning value decreases).

The learning-data-set addition unit 54 generates a data set (hereinafter, may be referred to as "third learning data set") obtained by additionally writing data (hereinafter, referred to as "priority data") indicating the assigned priority P to the acquired first learning data set. The learning-data-set addition unit 54 updates the learning database, by adding the generated third learning data set to the learning database stored in the learning-database storage unit 12.

Note that the learning-data-set addition unit 54 can exclude, from the learning database addition target, the third learning data set corresponding to the priority P less than a predetermined value. As a result, it is possible to prevent a data set with a low learning value from being added to the learning database.

Note that the learning-data-set addition unit 54 can assign the priority P again to each piece of the second learning data in the same manner as assigning the priority P to the first learning data set. As a result, the learning-data-set addition unit 54 can adjust the priority P in the learning database as a whole.

Note that there is a possibility that no learning data is included in the learning database at a timing or the like immediately after the system including the camera 2 (for example, a monitoring system, a security system, or an electronic mirror) starts operating. In such a case, the learning-database update unit 31 can newly create a learning database, by newly storing the third learning data set generated as described above in the learning-database storage unit 12. Thereafter, the learning-database update unit 31 can update the learning database by adding the newly generated third learning data set to the learning database as needed. That is, the learning-database update unit 31 can generate and update the learning database.

The learning unit 32 performs relearning or additional learning of the image recognition unit 22, using the learning database stored in the learning-database storage unit 12 (that is, using the learning database updated by the learning-database update unit 31). Hereinafter, relearning or additional learning may be collectively referred to as "relearning or the like".

That is, as described above, the image recognition unit 22 is learned in advance using the existing large-scale database. In addition, the image recognition unit 22 can freely learn using the updated learning database. Consequently, the learning unit 32 performs relearning or the like of the image recognition unit 22 using the updated learning database.

Relearning or the like of the first feature-amount extraction unit 41_1 is performed by, for example, supervised learning or unsupervised learning. Consequently, various known techniques related to supervised learning or unsupervised learning can be used for relearning or the like of the first feature-amount extraction unit 41_1. Detailed description of these techniques will be omitted.

Relearning or the like of the second feature-amount extraction unit 41_2 is performed by, for example, supervised learning. Consequently, various known techniques related to supervised learning can be used for relearning or the like of the second feature-amount extraction unit 41_2. As described above, the second feature-amount extraction unit 41_2 uses CNN. For this reason, relearning or the like of the second feature-amount extraction unit 41_2 can be performed by deep learning. Consequently, various known techniques related to deep learning can be used for relearning or the like of the second feature-amount extraction unit 41_2. Detailed description of these techniques will be omitted.

Relearning or the like of the object recognition unit 42 is performed by, for example, supervised learning. Consequently, various known techniques related to supervised learning can be used for relearning or the like of the object recognition unit 42. Detailed description of these techniques will be omitted.

Here, as described above, the priority P is assigned to each of the learning data sets included in the learning database. The learning unit 32 can thus vary a learning rate $\eta$ of relearning or the like, for each learning data set or for each label, depending on the assigned priority P. For example, the learning unit 32 can increase the learning rate $\eta$ as the assigned priority P becomes higher (that is, reduce the learning rate $\eta$ as the assigned priority P becomes lower).

Alternatively, the learning unit 32 can perform data augmentation on some of the learning data sets included in the learning database, depending on the assigned priority P. For example, the learning unit 32 performs data augmentation on a learning data set to which a high priority P is assigned. Various known techniques can be used for the data augmentation. Detailed description of these techniques will be omitted.

By setting the learning rate $\eta$ or performing the data augmentation, efficient relearning or the like can be implemented, using the learning database (that is, the database smaller than the existing large-scale database) stored in the learning-database storage unit 12.

Note that the updated learning database is a database smaller than the existing large-scale database. In addition, the updated learning database is based on an image (that is, an image captured by the camera 2) different from the image included in the existing large-scale database. Furthermore, the updated learning database can include a label different from a label included in the existing large-scale database.

Consequently, relearning or the like of the image recognition unit 22 by the learning unit 32 can be performed by transfer learning. In other words, various known techniques related to transfer learning can be used for relearning or the like of the image recognition unit 22 by the learning unit 32. Detailed description of these techniques will be omitted.

Furthermore, relearning or the like of the image recognition unit 22 by the learning unit 32 can be performed by fine tuning. In other words, various known techniques related to fine tuning can be used for relearning or the like of the image recognition unit 22 by the learning unit 32. Detailed description of these techniques will be omitted.

Further, relearning or the like of the image recognition unit 22 by the learning unit 32 can be performed by few-shot learning. In other words, various known techniques related to few-shot learning can be used for relearning or the like of the image recognition unit 22 by the learning unit 32. Detailed description of these techniques will be omitted.

Moreover, relearning or the like of the image recognition unit 22 by the learning unit 32 can be performed by meta-learning. In other words, various known techniques related to meta-learning can be used for relearning or the like of the image recognition unit 22 by the learning unit 32. Detailed description of these techniques will be omitted.

Further, relearning or the like of the image recognition unit 22 by the learning unit 32 can be performed by distillation. In other words, various known techniques related to distillation can be used for relearning or the like of the image recognition unit 22 by the learning unit 32. Detailed description of these techniques will be omitted.

When the system including the camera 2 (for example, a monitoring system, a security system, or an electronic mirror) is in operation, relearning or the like is repeatedly performed by the learning unit 32, so that image recognition performed by the image recognition unit 22 gradually adapts to the environment of the place where the camera 2 is installed. As a result, the accuracy of labeling by the learning-data-set generation unit 23 is gradually improved.

Hereinafter, the function of the image-signal acquisition unit 21 may be collectively referred to as "image-signal acquisition function". In addition, the image-signal acquisition function may be denoted as a reference sign "F1". In addition, the process performed by the image-signal acquisition unit 21 may be collectively referred to as "image-signal acquisition process".

Hereinafter, the function of the image recognition unit 22 may be collectively referred to as "image recognition function". In addition, the image recognition function may be denoted as a reference sign "F2". Furthermore, the process performed by the image recognition unit 22 may be collectively referred to as "image recognition process".

Hereinafter, the function of the learning-data-set generation unit 23 may be collectively referred to as "learning-data-set generation function". In addition, the learning-data-set generation function may be denoted as a reference sign "F3". Furthermore, the process performed by the learning-data-set generation unit 23 may be collectively referred to as "learning-data-set generation process".

Hereinafter, the function of the learning-database update unit 31 may be collectively referred to as "learning-database update function". In addition, the learning-database function may be denoted as a reference sign "F11". Furthermore, the process performed by the learning-database update unit 31 may be collectively referred to as "learning-database update process".

Hereinafter, the functions of the learning unit 32 may be collectively referred to as "learning function". In addition, the learning function may be denoted as a reference sign "F12". Furthermore, the process performed by the learning unit 32 may be collectively referred to as "learning process".

Next, a hardware configuration of a main part of the labeling device 100 will be described with reference to FIGS. 16 to 18.

Figure 16:
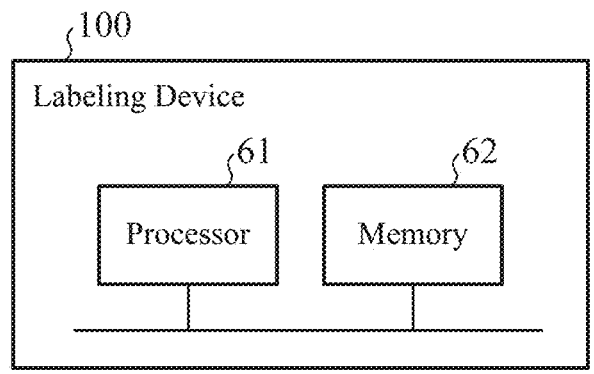
FIG. 16 is a block diagram illustrating a hardware configuration of a main part of the labeling device according to the first embodiment.

As illustrated in FIG. 16, the labeling device 100 includes a processor 61 and a memory 62. The memory 62 stores programs corresponding to the functions F1 to F3. The processor 61 reads and executes the programs stored in the memory 62. As a result, the functions F1 to F3 are implemented.

Figure 17:
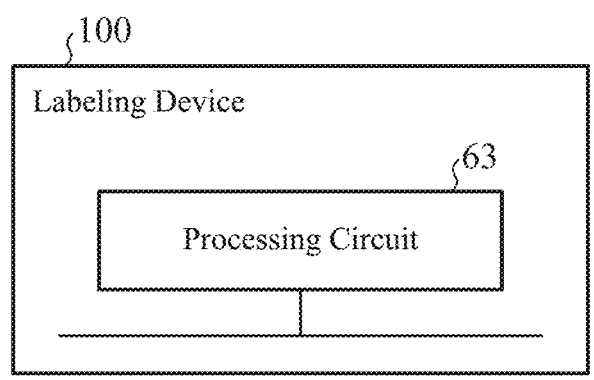
FIG. 17 is a block diagram illustrating another hardware configuration of the main part of the labeling device according to the first embodiment.

Alternatively, as illustrated in FIG. 17, the labeling device 100 includes a processing circuit 63. The processing circuit 63 performs the processes corresponding to the functions F1 to F3. As a result, the functions F1 to F3 are implemented.

Figure 18:
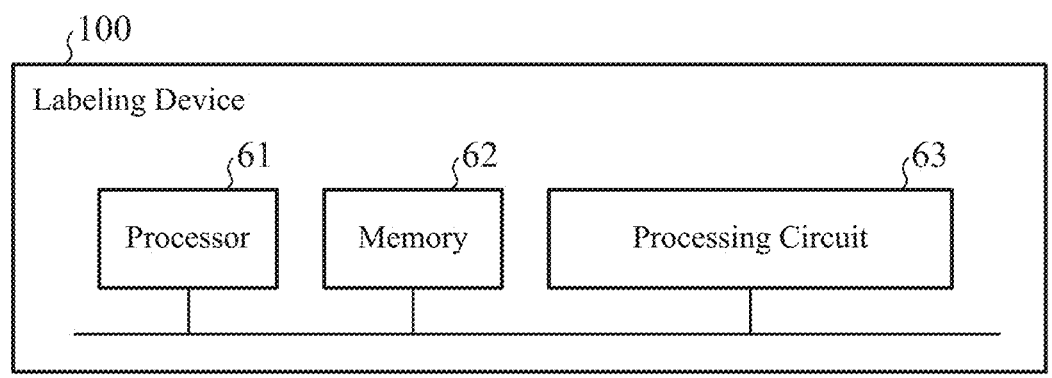
FIG. 18 is a block diagram illustrating yet another hardware configuration of the main part of the labeling device according to the first embodiment.

Alternatively, as illustrated in FIG. 18, the labeling device 100 includes the processor 61, the memory 62, and the processing circuit 63. The memory 62 stores at least one program corresponding to a part of the functions F1 to F3. The processor 61 reads and executes the program stored in the memory 62. As a result, such a part of the functions is implemented. In addition, the processing circuit 63 performs at least one process corresponding to the remaining of the functions F1 to F3. As a result, the remaining function is implemented.

The processor 61 includes one or more processors. Each processor uses, for example, a central processing unit (CPU), a graphics processing unit (GPU), a microprocessor, a microcontroller, or a digital signal processor (DSP).

The memory 62 includes one or more nonvolatile memories. Alternatively, the memory 62 includes one or more nonvolatile memories and one or more volatile memories. That is, the memory 62 includes one or more memories. Each memory uses, for example, a semiconductor memory, a magnetic disk, an optical disk, a magneto-optical disk, a magnetic tape, or a magnetic drum. More specifically, each volatile memory uses, for example, a random access memory (RAM). Here, each nonvolatile memory uses, for example, a read only memory (ROM), a flash memory, an erasable programmable read only memory (EPROM), an electrically erasable programmable read only memory (EEPROM), a solid state drive, a hard disk drive, a flexible disk, a compact disk, a digital versatile disc (DVD), a Blu-ray disk, or a mini disk.

The processing circuit 63 includes one or more digital circuits. Alternatively, the processing circuit 63 includes one or more digital circuits and one or more analog circuits. That is, the processing circuit 63 includes one or more processing circuits. Each processing circuit uses, for example, an application specific integrated circuit (ASIC), a programmable logic device (PLD), a field programmable gate array (FPGA), a system on a chip (SoC), or a system large scale integration (LSI).

Here, when the processor 61 includes a plurality of processors, the correspondence relationship between the functions F1 to F3 and the processors is freely determined. That is, each of the processors can read and execute one or more programs corresponding to one or more corresponding functions among the functions F1 to F3. The processor 61 can include dedicated processors corresponding to the individual functions F1 to F3.

In addition, when the memory 62 includes a plurality of memories, the correspondence relationship between the functions F1 to F3 and the memories is freely determined. That is, each of the memories can store one or more programs corresponding to one or more corresponding functions among the functions F1 to F3. The memory 62 can include dedicated memories corresponding to the individual functions F1 to F3.

In addition, when the processing circuit 63 includes a plurality of processing circuits, the correspondence relationship between the functions F1 to F3 and the processing circuits is freely determined. That is, each of the processing circuits can perform one or more processes corresponding to one or more corresponding functions among the functions F1 to F3. The processing circuit 63 can include dedicated processing circuits corresponding to the individual functions F1 to F3.

Next, a hardware configuration of a main part of the learning device 200 will be described with reference to FIGS. 19 to 21.

Figure 19:
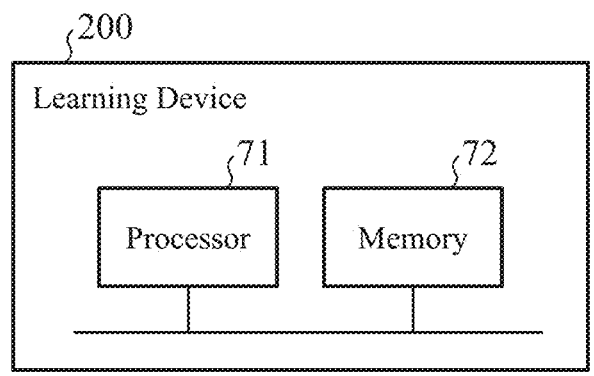
FIG. 19 is a block diagram illustrating a hardware configuration of a main part of the learning device according to the first embodiment.

As illustrated in FIG. 19, the learning device 200 includes a processor 71 and a memory 72. The memory 72 stores programs corresponding to the functions F11 and F12. The processor 71 reads and executes the programs stored in the memory 72. As a result, the functions F11 and F12 are implemented.

Figure 20:
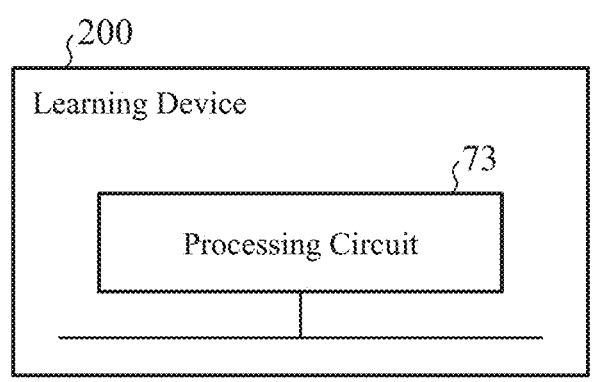
FIG. 20 is a block diagram illustrating another hardware configuration of the main part of the learning device according to the first embodiment.

Alternatively, as illustrated in FIG. 20, the learning device 200 includes a processing circuit 73. The processing circuit 73 performs the processes corresponding to the functions F11 and F12. As a result, the functions F11 and F12 are implemented.

Figure 21:
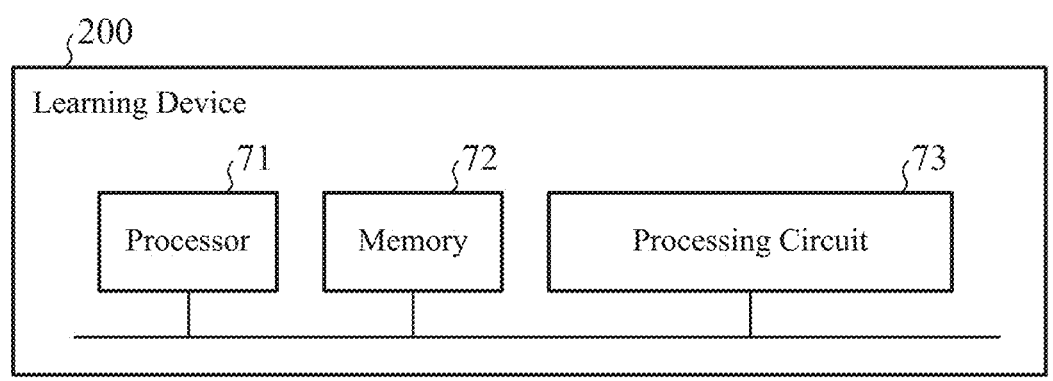
FIG. 21 is a block diagram illustrating yet another hardware configuration of the main part of the learning device according to the first embodiment.

Alternatively, as illustrated in FIG. 21, the learning device 200 includes the processor 71, the memory 72, and the processing circuit 73. The memory 72 stores a program corresponding to a part of the functions F11 and F12. The processor 71 reads and executes the program stored in the memory 72. As a result, such a part of the functions is implemented. In addition, the processing circuit 73 performs the process corresponding to the remaining of the functions F11 and F12. As a result, the remaining function is implemented.

The specific example of the processor 71 is similar to the specific example of the processor 61. The specific example of the memory 72 is similar to the specific example of the memory 62. The specific example of the processing circuit 73 is similar to the specific example of the processing circuit 63. Consequently, the detailed description thereof will be omitted.

Here, when the processor 71 includes a plurality of processors, the correspondence relationship between the functions F11 and F12 and the processors is freely determined. That is, each of the processors can read and execute one or more programs corresponding to one or more corresponding functions of the functions F11 and F12. The processor 71 can include dedicated processors corresponding to the individual functions F11 and F12.

In addition, when the memory 72 includes a plurality of memories, the correspondence relationship between the functions F11 and F12 and the memories is freely determined. That is, each of the memories can store one or more programs corresponding to one or more corresponding functions of the functions F11 and F12. The memory 72 can include dedicated memories corresponding to the individual functions F11 and F12.

In addition, when the processing circuit 73 includes a plurality of processing circuits, the correspondence relationship between the functions F11 and F12 and the processing circuits is freely determined. That is, each of the processing circuits can perform one or more processes corresponding to one or more corresponding functions of the functions F11 and F12. The processing circuit 73 can include dedicated processing circuits corresponding to the individual functions F11 and F12.

Figure 22:
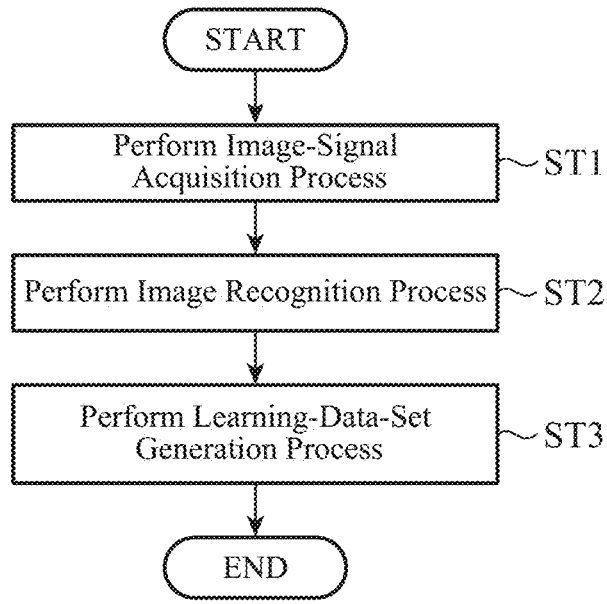
FIG. 22 is a flowchart illustrating an operation of the labeling device according to the first embodiment.

Next, an operation of the labeling device 100 will be described with reference to a flowchart of FIG. 22.

First, the image-signal acquisition unit 21 performs the image-signal acquisition process (step ST1). Next, the image recognition unit 22 performs the image recognition process (step ST2). The learning-data-set generation unit 23 then performs the learning-data-set generation process (step ST3).

Figure 23:
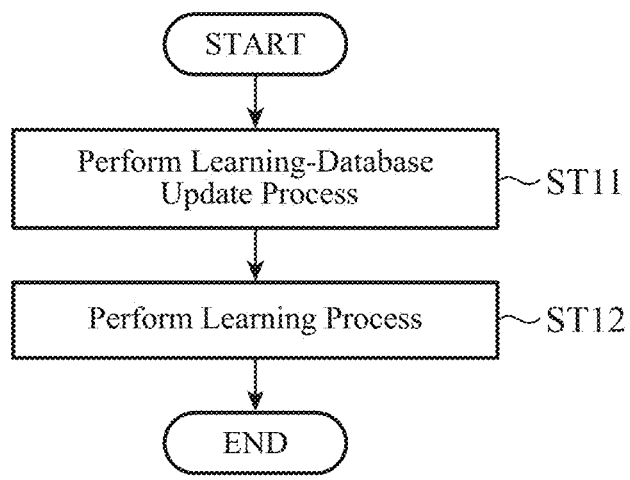
FIG. 23 is a flowchart illustrating an operation of the learning device according to the first embodiment.

Next, an operation of the learning device 200 will be described with reference to a flowchart of FIG. 23.

First, the learning-database update unit 31 performs the learning-database update process (step ST11). Next, the learning unit 32 performs the learning process (step ST12).

Next, a modification of the labeling system 1 will be described with reference to FIG. 24.

Figure 24:
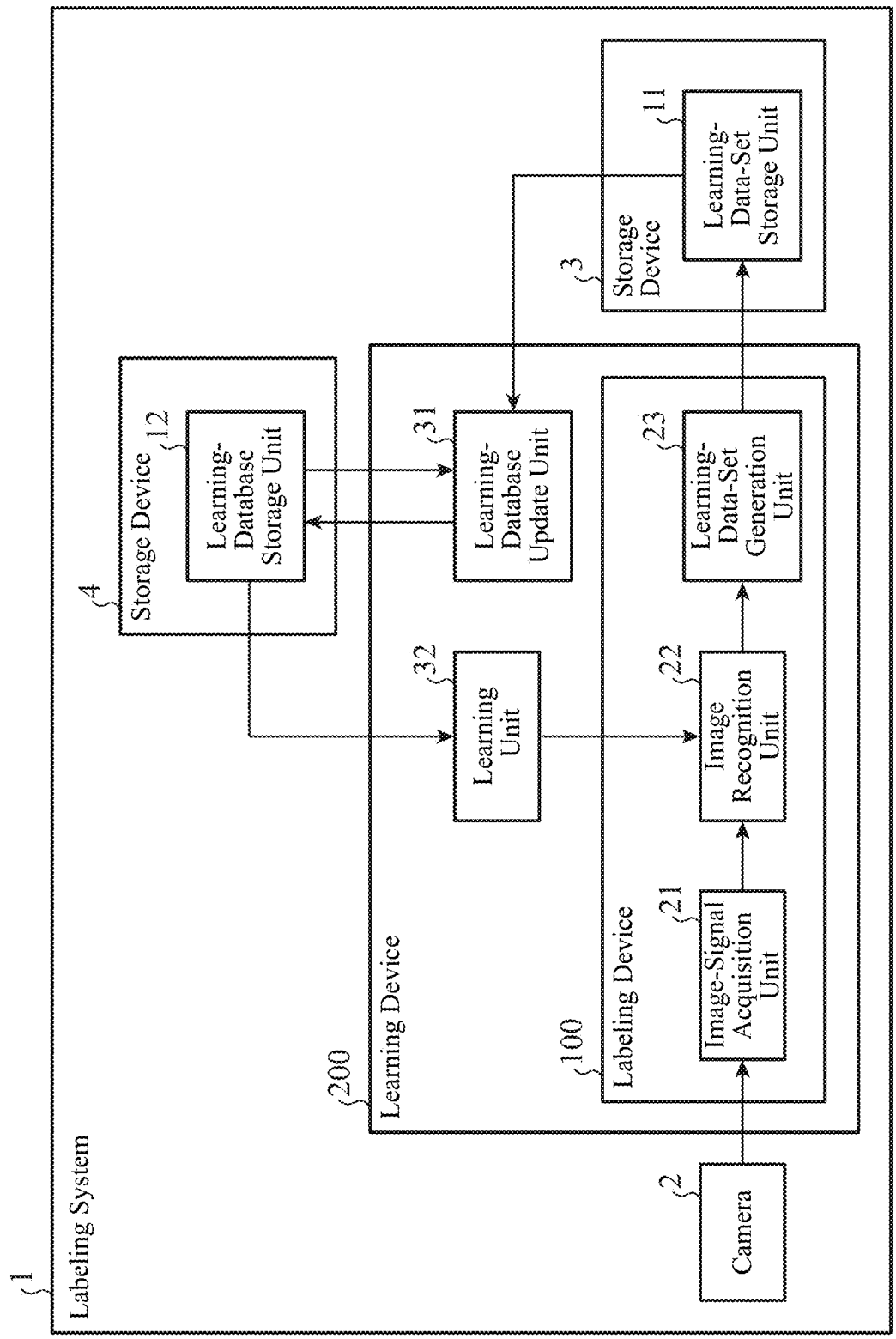
FIG. 24 is a block diagram illustrating a main part of another labeling system according to the first embodiment.

As illustrated in FIG. 24, the learning device 200 can include the labeling device 100. That is, the learning device 200 can include the image-signal acquisition unit 21, the image recognition unit 22, the learning-data-set generation unit 23, the learning-database update unit 31, and the learning unit 32.

Next, another modification of the labeling system 1 will be described with reference to FIG. 25.

Figure 25:
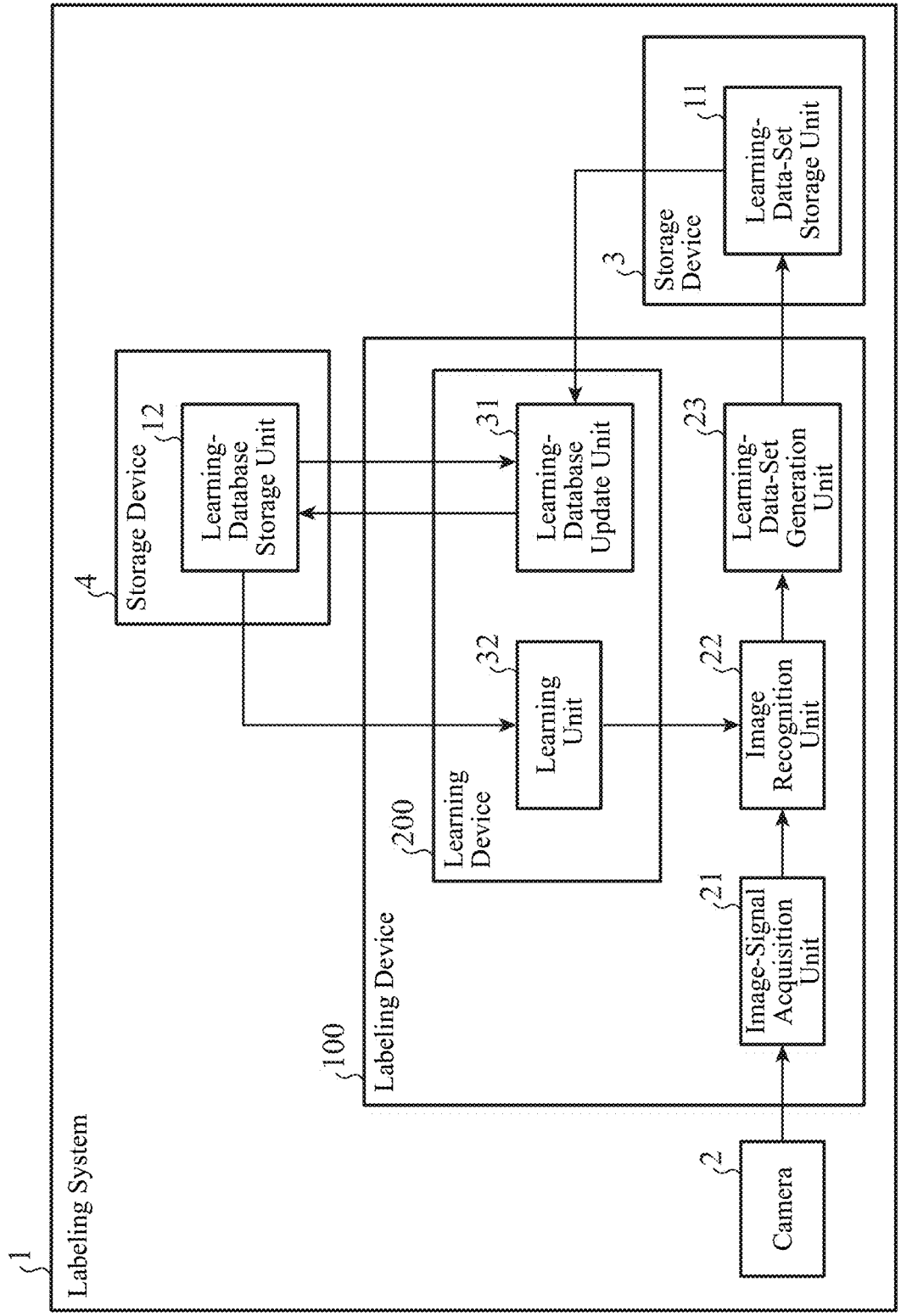
FIG. 25 is a block diagram illustrating a main part of yet another labeling system according to the first embodiment.

As illustrated in FIG. 25, the labeling device 100 can include the learning device 200. That is, the labeling device 100 can include the image-signal acquisition unit 21, the image recognition unit 22, the learning-data-set generation unit 23, the learning-database update unit 31, and the learning unit 32.

Next, yet other modifications of the labeling system 1 will be described.

The labeling device 100 can be integrated with the camera 2. Alternatively, the learning device 200 can be integrated with the camera 2. As a result, the artificial intelligence (AI) camera can be implemented.

The labeling device 100 can include a server that is communicable with the camera 2. Alternatively, the learning device 200 can include a server that is communicable with the camera 2. Such a server can use an edge server. As a result, the edge AI camera can be implemented.

As described above, the labeling device 100 according to the first embodiment includes the image-signal acquisition unit 21 that acquires an image signal indicating an image captured by the camera 2, the image recognition unit 22 that has learned by machine learning and performs image recognition on the captured image, and the learning-data-set generation unit 23 that generates a learning data set including image data corresponding to each object and label data corresponding to each object by performing labeling on each object included in the captured image on the basis of a result of the image recognition. As a result, the labeling work can be automated in generating the learning data set using the image captured by the camera 2. As a result, the workload on the labeling person can be reduced.

In addition, the image recognition unit 22 has learned using the existing large-scale database. As a result, not only highly accurate object recognition can be implemented for a learned object, but also object recognition with a certain degree of accuracy can be implemented for an unlearned object.

Furthermore, the image recognition unit 22 includes the first feature-amount extraction unit 41_1 that generates a first feature map corresponding to a captured image, the second feature-amount extraction unit 41_2 that generates a second feature map corresponding to the captured image, and the object recognition unit 42 that performs object recognition using the first feature map and the second feature map. The first feature map corresponds to a foreground mask or corresponds to a mid-level feature corresponding to objectness, and the second feature map corresponds to a high-level feature. The accuracy of object recognition can be improved by using the first feature map in addition to the second feature map. In particular, the accuracy of object recognition for an unlearned object can be improved.

Furthermore, the image recognition unit 22 includes the object tracking unit 43 that tracks each object by using a result of object recognition in time series. As a result, each object can be recognized with higher accuracy.

Further, the learning device 200 according to the first embodiment is the learning device 200 for the labeling device 100, and includes the learning-database update unit 31 that updates a learning database by adding the learning data set generated by the learning-data-set generation unit 23 to the learning database, and the learning unit 32 that performs relearning or additional learning of the image recognition unit 22 using the learning database. Consequently, relearning or the like by transfer learning, fine tuning, Few-shot learning, meta learning or distillation can be implemented for the image recognition unit 22. As a result, the accuracy of image recognition can be gradually improved, and the accuracy of labeling can also be gradually improved. Furthermore, in automating the labeling work, it is possible to eliminate the need for a person corresponding to Oracle in Active Learning.

In addition, the learning-database update unit 31 assigns the priority P to the learning data set generated by the learning-data-set generation unit 23, on the basis of the variation in the distribution D of a plurality of learning data sets included in the learning database. By using the priority P, efficient relearning or the like can be implemented using the learning database that is smaller than the existing large-scale database.

Furthermore, the learning unit 32 sets the learning rate η of relearning or additional learning depending on the priority P. As a result, efficient relearning or the like can be implemented.

Moreover, the learning unit 32 performs data augmentation on the learning database depending on the priority P. As a result, efficient relearning or the like can be implemented.

Second Embodiment

Figure 26:
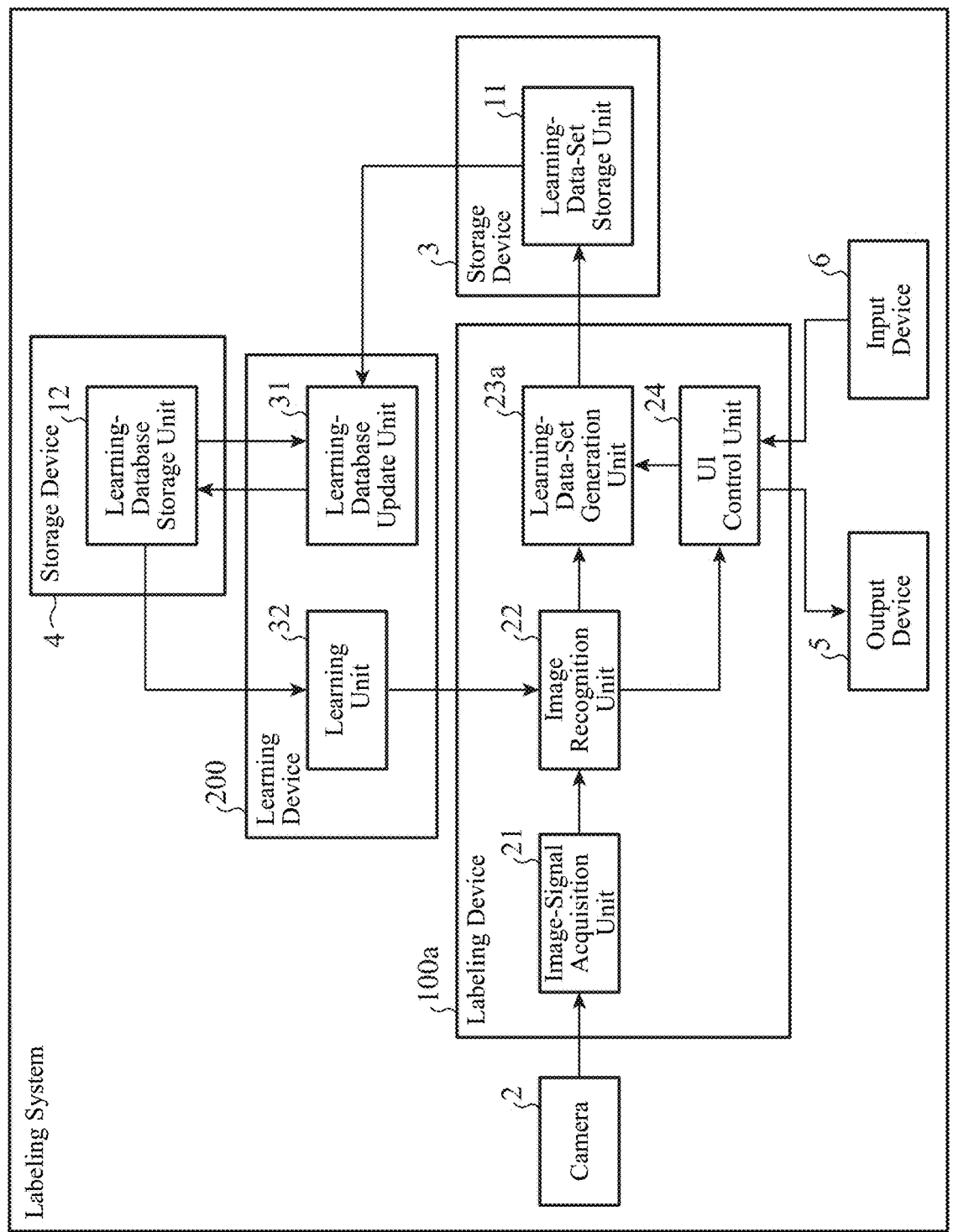
FIG. 26 is a block diagram illustrating a main part of a labeling system according to a second embodiment.

FIG. 26 is a block diagram illustrating a main part of a labeling system according to a second embodiment. The labeling system according to the second embodiment will be described with reference to FIG. 26. Note that, in FIG. 26, the same reference numerals are given to blocks similar to those illustrated in FIG. 1, and the description thereof will be omitted.

As illustrated in FIG. 26, a labeling system 1a includes the camera 2, the storage device 3, the storage device 4, an output device 5, an input device 6, a labeling device 100a, and the learning device 200. The labeling device 100a includes the image-signal acquisition unit 21, the image recognition unit 22, a learning-data-set generation unit 23a, and a user-interface control unit (hereinafter, denoted as "UI control unit") 24.

The output device 5 includes, for example, a display or a speaker. The input device 6 includes a device corresponding to the output device 5. For example, in a case where the output device 5 includes a display, the input device 6 includes a touch panel and a touch pen. Alternatively, for example, in a case where the output device 5 includes a speaker, the input device 6 includes a microphone.

The UI control unit 24 executes control to output the result of image recognition by the image recognition unit 22, using the output device 5. Furthermore, the UI control unit 24 performs a process of receiving an input of an operation using the input device 6, that is, an input of an operation of correcting the result of image recognition (hereinafter, may be referred to as "correction operation").

Specifically, for example, the UI control unit 24 executes control to display a screen (hereinafter, may be referred to as "correction screen") including an image indicating the result of image recognition by the image recognition unit 22, using a display. In addition, the UI control unit 24 performs a process of receiving an input of the correction operation using a touch panel and a touch pen. That is, the UI control unit 24 performs a process of receiving an input of the correction operation through a handwriting input to the correction screen.

Alternatively, for example, the UI control unit 24 executes control to output a voice indicating the result of image recognition by the image recognition unit 22, using a speaker. In addition, the UI control unit 24 performs a process of receiving an input of the correction operation using a microphone. That is, the UI control unit 24 performs a process of receiving an input of the correction operation through a voice input. In this case, various known techniques related to speech recognition can be used for the process of receiving the input of the correction operation.

Here, the UI related to the input of the correction operation can use an interactive UI. As a result, the labeling person can easily correct the result of image recognition by the image recognition unit 22.

The learning-data-set generation unit 23a generates a learning data set similar to the learning data set generated by the learning-data-set generation unit 23. That is, the learning-data-set generation unit 23a generates a first learning data set including image data, label data, mask data, confidence data, and the like, on the basis of the result of image recognition by the image recognition unit 22. The learning-data-set generation unit 23a generates a third learning data set by adding priority data to the generated first learning data set. The learning-data-set generation unit 23a stores the generated third learning data set in the learning-data-set storage unit 11.

Note that, in a case where the result of image recognition by the image recognition unit 22 is corrected by the correction operation, the learning-data-set generation unit 23a generates the first learning data based on the result of the correction.

Hereinafter, the function of the learning-data-set generation unit 23a may be collectively referred to as "learning-data-set generation function". In addition, the learning-data-set generation function may be denoted as a reference sign "F3a". Furthermore, the process performed by the learning-data-set generation unit 23a may be collectively referred to as "learning-data-set generation process".

Hereinafter, the function of the UI control unit 24 may be collectively referred to as "UI control function". In addition, the UI control function may be denoted as a reference sign "F4". Furthermore, the control and process performed by the UI control unit 24 may be collectively referred to as "output control and operation input process".

The hardware configuration of the main part of the labeling device 100a is similar to that described in the first embodiment with reference to FIGS. 16 to 18. Consequently, the detailed description thereof will be omitted. That is, the labeling device 100a has the functions F1, F2, F3a, and F4. Each of the functions F1, F2, F3a, and F4 can be implemented by the processor 61 and the memory 62, or can be implemented by the processing circuit 63.

Figure 27:
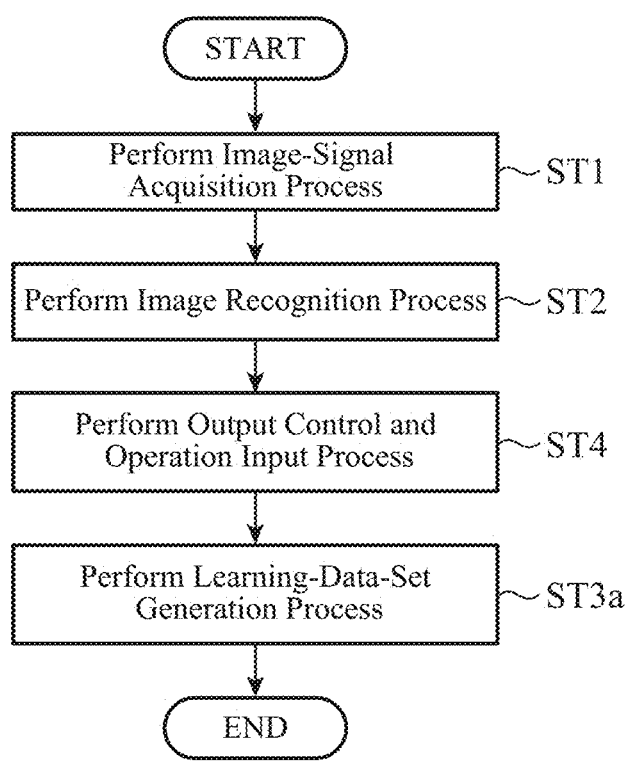
FIG. 27 is a flowchart illustrating an operation of a labeling device according to the second embodiment.

Next, an operation of the labeling device 100a will be described with reference to a flowchart of FIG. 27. Note that, in FIG. 27, the same reference numerals are given to steps similar to those illustrated in FIG. 22, and the description thereof will be omitted.

The process of step ST1 is performed first. Next, the process of step ST2 is performed. The UI control unit 24 then performs the output control and the operation input process (step ST4). Next, the learning-data-set generation unit 23a performs the learning-data-set generation process (step ST3a).

Next, a modification of the labeling system 1a will be described with reference to FIG. 28.

Figure 28:
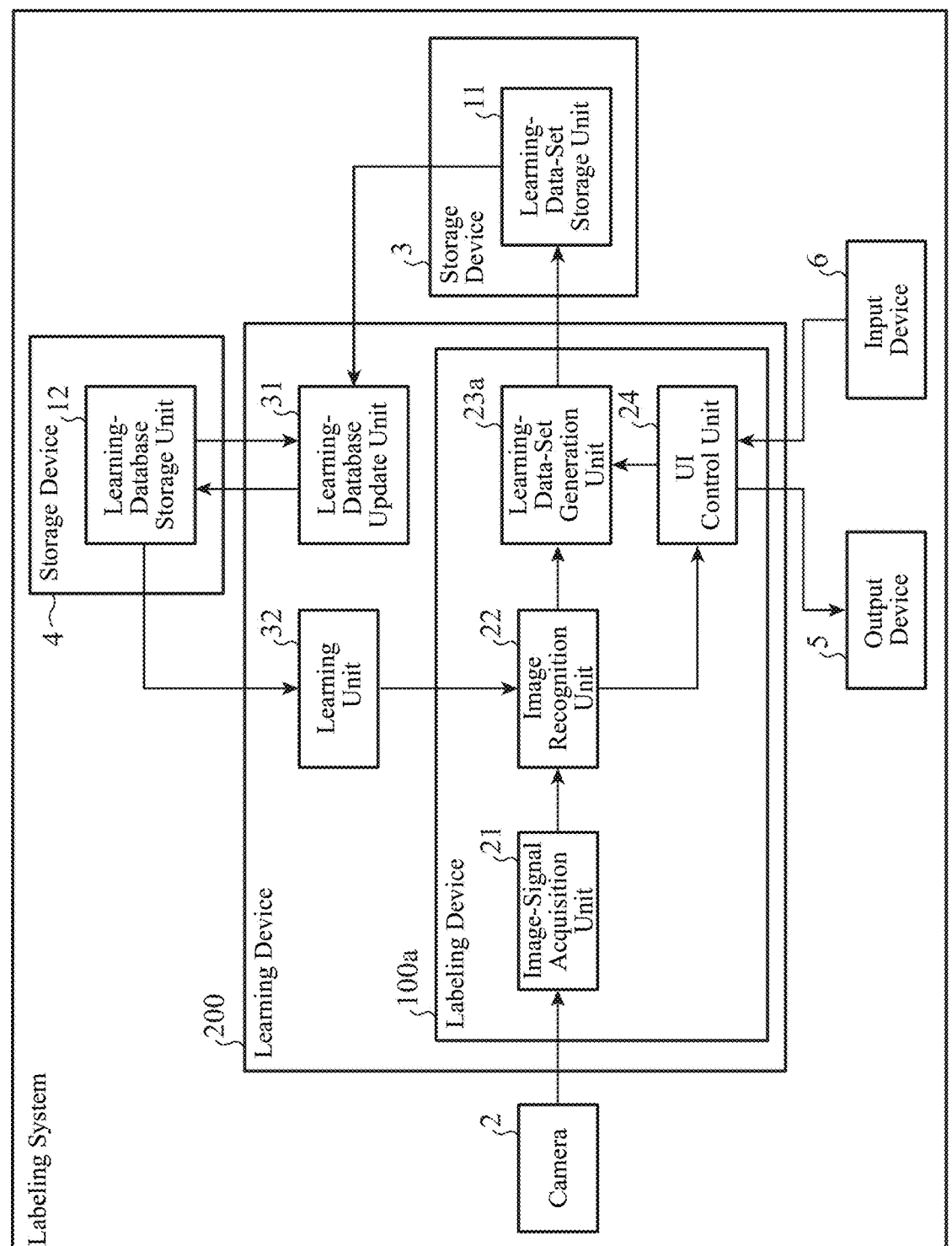
FIG. 28 is a block diagram illustrating a main part of another labeling system according to the second embodiment.

As illustrated in FIG. 28, the learning device 200 can include the labeling device 100a. That is, the learning device 200 can include the image-signal acquisition unit 21, the image recognition unit 22, the learning-data-set generation unit 23a, the UI control unit 24, the learning-database update unit 31, and the learning unit 32.

Next, another modification of the labeling system 1a will be described with reference to FIG. 29.

Figure 29:
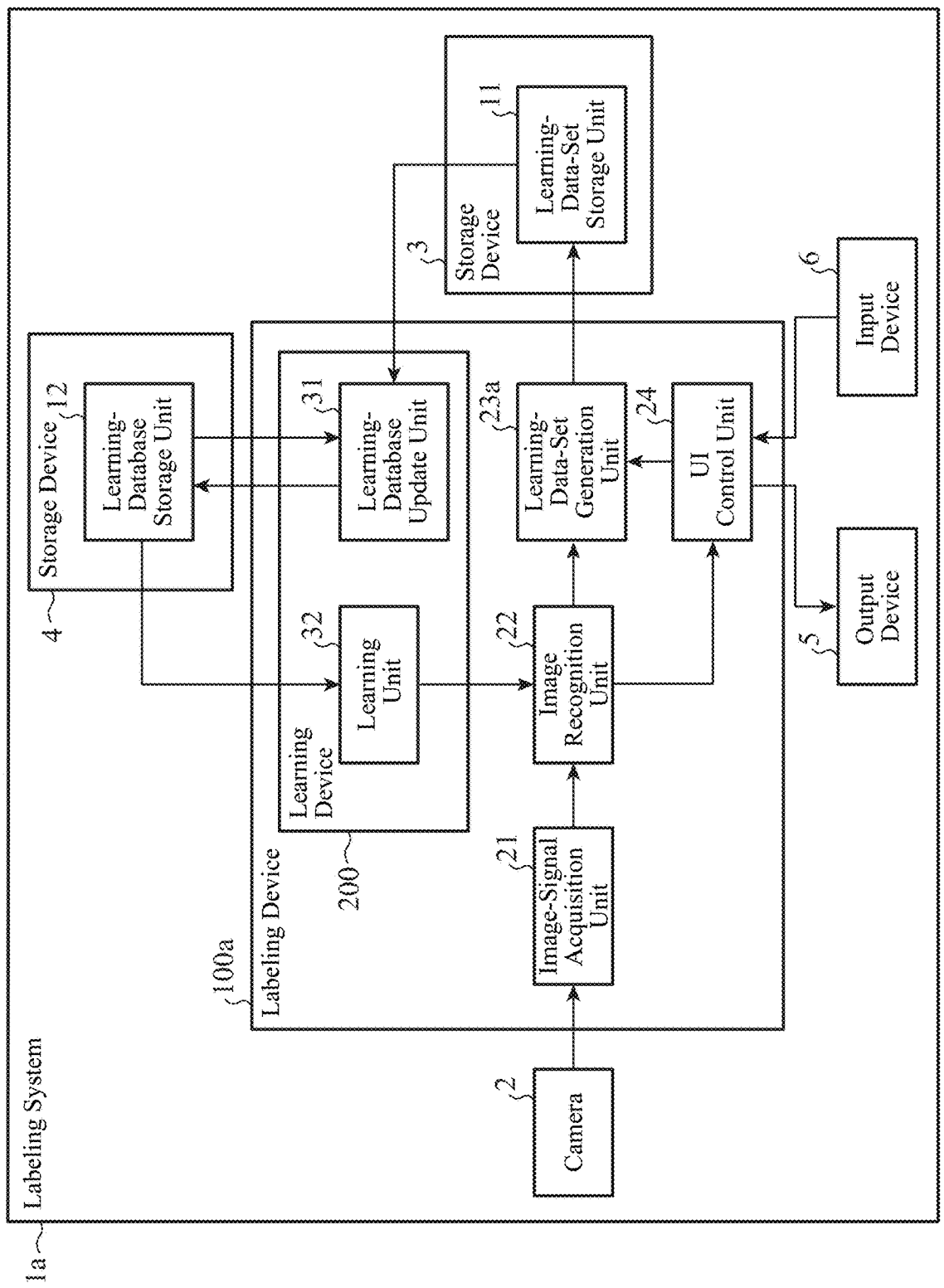
FIG. 29 is a block diagram illustrating a main part of yet another labeling system according to the second embodiment.

As illustrated in FIG. 29, the labeling device 100a can include the learning device 200. That is, the labeling device 100a can include the image-signal acquisition unit 21, the image recognition unit 22, the learning-data-set generation unit 23a, the UI control unit 24, the learning-database update unit 31, and the learning unit 32.

Next, yet other modifications of the labeling system 1a will be described.

The labeling device 100a can be integrated with the camera 2. Alternatively, the learning device 200 can be integrated with the camera 2. As a result, the AI camera can be implemented.

The labeling device 100a can include a server that is communicable with the camera 2. Alternatively, the learning device 200 can include a server that is communicable with the camera 2. Such a server can use, for example, an edge server. As a result, the edge AI camera can be implemented.

As described above, the labeling device 100a according to the second embodiment includes the UI control unit 24 that executes the control to output a result of image recognition and performs the process of receiving an input of the operation of correcting the result of image recognition, and the learning-data-set generation unit 23a generates a learning data set on the basis of the result of the correction made by the operation. As a result, the labeling work can be semi-automated in generating the learning data set using an image captured by the camera 2. In other words, the labeling work of the labeling person can be supported. As a result, the workload on the labeling person can be reduced.

Furthermore, the UI control unit 24 executes the control to display a screen including an image indicating a result of image recognition, and performs the process of receiving an input of an operation through a handwriting input to the screen. By using such a UI, the result of image recognition can be easily corrected.

Furthermore, the UI control unit 24 executes the control to output a voice indicating a result of image recognition, and performs the process of receiving an input of an operation through a voice input. By using such a UI, the result of image recognition can be easily corrected.

Note that it is possible to freely combine the embodiments, modify any component of each embodiment, or omit any component of each embodiment within the scope of the present disclosure.

INDUSTRIAL APPLICABILITY

The labeling device and the learning device according to the present disclosure can be used for, for example, a monitoring system, a security system, or an electronic mirror.

REFERENCE SIGNS LIST 1, 1a: labeling system, 2: camera, 3: storage device, 4: storage device, 5: output device, 6: input device, 11: learning-data-set storage unit, 12: learning-database storage unit, 21: image-signal acquisition unit, 22: image recognition unit, 23, 23a: learning-data-set generation unit, 24: UI control unit, 31: learning-database update unit, 32: learning unit, 41: feature-amount extraction unit, 41_1: first feature-amount extraction unit, 41_2: second feature-amount extraction unit, 42: object recognition unit, 43: object tracking unit, 51: learning-data-set acquisition unit, 52: learning-data-set acquisition unit, 53: priority assignment unit, 54: learning-data-set addition unit, 61: processor, 62: memory, 63: processing circuit, 71: processor, 72: memory, 73: processing circuit, 100, 100a: labeling device, 200: learning device

The invention claimed is:

1. A labeling device comprising:
image-signal acquisition circuitry to acquire an image signal indicating an image captured by a camera;
image recognition circuitry which has learned by machine learning, to perform image recognition on the captured image based on a similarity between two different feature maps generated based on the captured image; and
learning-data-set generation circuitry to generate, by performing labeling on one or more individual objects included in the captured image on a basis of a result of the image recognition, a learning data set including image data corresponding to each of the objects and label data corresponding to each of the objects.

2. The labeling device according to claim 1, wherein the image recognition circuitry has learned using an existing large-scale database.

3. The labeling device according to claim 1, further comprising UI control circuitry to execute control to output the result of the image recognition and to perform a process of receiving an input of an operation of correcting the result of the image recognition,
wherein the learning-data-set generation circuitry generates the learning data set on a basis of a result of a correction made by the operation.

4. The labeling device according to claim 3, wherein the UI control circuitry executes control to display a screen including an image indicating the result of the image recognition, and performs a process of receiving an input of the operation through a handwriting input to the screen.

5. The labeling device according to claim 3, wherein the UI control circuitry executes control to output a voice indicating the result of the image recognition, and performs a process of receiving an input of the operation through a voice input.

6. The labeling device according to claim 1, wherein the camera is a monitoring camera.

7. The labeling device according to claim 6, wherein the camera is a surveillance camera, a security camera, or an electronic mirror camera.

8. A learning device for the labeling device according to claim 1, the learning device comprising:
- learning-database update circuitry to update a learning database, by adding the learning data set generated by the learning-data-set generation circuitry to the learning database; and
- learning circuitry to perform relearning or additional learning of the image recognition circuitry, using the learning database.

9. The learning device according to claim 1, wherein the generation of the learning-data-set, including the labeling on the one or more individual objects, is performed automatically by the learning-data-set generation circuitry.

10. A labeling device according comprising:
- image-signal acquisition circuitry to acquire an image signal indicating an image captured by a camera;
- image recognition circuitry which has learned by machine learning, to perform image recognition on the captured image; and
- learning-data-set generation circuitry to generate, by performing labeling on one or more individual objects included in the captured image on a basis of a result of the image recognition, a learning data set including image data corresponding to each of the objects and label data corresponding to each of the objects,
- wherein the image recognition circuitry includes first feature-amount extraction circuitry to generate a first feature map corresponding to the captured image, second feature-amount extraction circuitry to generate a second feature map corresponding to the captured image, and object recognition circuitry to perform object recognition using the first feature map and the second feature map,
- the first feature map corresponds to a foreground mask or corresponds to a mid-level feature corresponding to objectness, and
- the second feature map corresponds to a high-level feature.

11. The labeling device according to claim 10, wherein the first feature-amount extraction circuitry generates the first feature map using at least one of image gradient detection, saliency estimation, background subtraction, objectness estimation, attention, and scene segmentation.

12. The labeling device according to claim 10, wherein the object recognition circuitry weights, using one or more individual first feature amounts in the first feature map, one or more corresponding second feature amounts in the second feature map.

13. The labeling device according to claim 12, wherein the object recognition circuitry sets importance of the weighting on a basis of similarity between each of the first feature amounts and a corresponding one of the second feature amounts.

14. The labeling device according to claim 13, wherein the similarity is a value based on at least one of EMD, cosine similarity, KLD, L2 norm, L1 norm, and Manhattan distance.

15. The labeling device according to claim 12, wherein in a case where the first feature map uses attention, the object recognition circuitry selects a representative value in the first feature map, and sets the importance of the weighting on a basis of the representative value.

16. The labeling device according to claim 10,
- wherein the object recognition includes at least one of object detection and scene segmentation,
- the object detection is to estimate a position of each of the objects by regression and to estimate an attribute of each of the objects by classification, and
- the scene segmentation is to divide the captured image into regions which correspond to respective attributes.

17. The labeling device according to claim 10, wherein the image recognition circuitry includes object tracking circuitry to track each of the objects by using a result of the object recognition in time series.

18. The labeling device according to claim 10, wherein the first feature-amount extraction circuitry can be learned by supervised learning or unsupervised learning.

19. The labeling device according to claim 10, wherein the second feature-amount extraction circuitry can be learned by supervised learning.

20. The labeling device according to claim 10, wherein the second feature-amount extraction circuitry can be learned by deep learning.

21. The labeling device according to claim 10, wherein the second feature-amount extraction circuitry uses a convolutional neural network.

22. The labeling device according to claim 10, wherein the object recognition circuitry can be learned by supervised learning.

23. A learning device comprising:
- image-signal acquisition circuitry to acquire an image signal indicating an image captured by a camera;
- image recognition circuitry which has learned by machine learning, to perform image recognition on the captured image;
- learning-data-set generation circuitry to generate, by performing labeling on one or more individual objects included in the captured image on a basis of a result of the image recognition, a learning data set including image data corresponding to each of the objects and label data corresponding to each of the objects;
- learning-database update circuitry to update a learning database, by adding the learning data set generated by the learning-data-set generation circuitry to the learning database; and
- learning circuitry to perform relearning or additional learning of the image recognition circuitry, using the learning database,
- wherein the learning-database update circuitry assigns a priority to the learning data set generated by the learning-data-set generation circuitry, on a basis of a variation in a distribution of a plurality of learning data sets included in the learning database.

24. The learning device according to claim 23, wherein the priority is set to a value based on a learning value of the learning data set generated by the learning-data-set generation circuitry.

25. The learning device according to claim 23, wherein the distribution is based on at least one of confidence, a size, a high-dimensional image feature, a low-dimensional image feature, objectness, saliency estimation, and attention.

26. The learning device according to claim 23, wherein the learning circuitry sets a learning rate of the relearning or the additional learning depending on the priority.

27. The learning device according to claim 23, wherein the learning circuitry performs data augmentation on the learning database depending on the priority.

* * * * *